US011305777B2

(12) United States Patent
Batts et al.

(10) Patent No.: US 11,305,777 B2
(45) Date of Patent: Apr. 19, 2022

(54) DETECTING ROAD ANOMALIES

(71) Applicant: Motional AD LLC, Boston, MA (US)

(72) Inventors: Zachary Thomas Batts, Pittsburgh, PA (US); Ludong Sun, Pittsburgh, PA (US); Ky Woodard, Pittsburgh, PA (US); Qian Wang, Allison Park, PA (US); Yiming Zhao, Allison Park, PA (US); Stephanie Lee, Pittsburgh, PA (US); Lin Zhao, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 16/775,206

(22) Filed: Jan. 28, 2020

(65) Prior Publication Data

US 2020/0238999 A1 Jul. 30, 2020

Related U.S. Application Data

(60) Provisional application No. 62/797,895, filed on Jan. 28, 2019.

(30) Foreign Application Priority Data

Feb. 27, 2019 (DK) .............................. PA201970135

(51) Int. Cl.
*B60W 40/068* (2012.01)
*G05D 1/02* (2020.01)
(Continued)

(52) U.S. Cl.
CPC .......... *B60W 40/068* (2013.01); *B60W 30/09* (2013.01); *B60W 30/18163* (2013.01);
(Continued)

(58) Field of Classification Search
CPC .......... B60W 40/068; B60W 60/0015; B60W 30/09; B60W 30/18163; B60W 50/00; E01H 1/053; G05B 13/029
See application file for complete search history.

(56) References Cited

U.S. PATENT DOCUMENTS

2002/0124629 A1   9/2002   Hurson
2008/0234900 A1   9/2008   Bennett
(Continued)

FOREIGN PATENT DOCUMENTS

DE   102012018122   3/2013
EP   1449688        8/2004
(Continued)

OTHER PUBLICATIONS

DK 5th Office Action in Danish Appln. No. PA201970135, dated Oct. 20, 2020, 2 pages.
(Continued)

*Primary Examiner* — Michael D Lang
(74) *Attorney, Agent, or Firm* — Fish & Richardson P.C.

(57) ABSTRACT

An apparatus is provided which includes a processing circuit and a plurality of sensors connected to a vehicle, where at least one of the plurality of sensors is positioned on an undercarriage of the vehicle. The plurality of sensors can detect variations in a road on which the vehicle is traveling. The plurality of sensors can also generate information corresponding to the variations of the road. The plurality of sensors can also transmit the information corresponding to the variations in the road to the processing circuit. The information collected by the plurality of sensors may then be used to augment a driving capability of the vehicle.

23 Claims, 20 Drawing Sheets

(51) Int. Cl.
| | |
|---|---|
| *B60W 50/00* | (2006.01) |
| *B60W 30/18* | (2012.01) |
| *B60W 60/00* | (2020.01) |
| *B60W 30/09* | (2012.01) |
| *E01H 1/05* | (2006.01) |
| *G05B 13/02* | (2006.01) |
| *G08G 1/0967* | (2006.01) |

(52) U.S. Cl.
CPC ........ *B60W 50/00* (2013.01); *B60W 60/0015* (2020.02); *E01H 1/053* (2013.01); *G05B 13/029* (2013.01); *G05D 1/0214* (2013.01); *G05D 1/0223* (2013.01); *G05D 1/0276* (2013.01); *B60W 2050/0026* (2013.01); *B60W 2552/20* (2020.02); *B60W 2552/40* (2020.02); *B60W 2554/00* (2020.02); *B60W 2555/20* (2020.02); *B60W 2556/45* (2020.02); *B60W 2720/10* (2013.01); *B60W 2720/106* (2013.01); *G05D 2201/0203* (2013.01); *G05D 2201/0213* (2013.01); *G08G 1/096725* (2013.01)

(56) References Cited

U.S. PATENT DOCUMENTS

| | | | |
|---|---|---|---|
| 2009/0164063 | A1 | 6/2009 | Piccinini et al. |
| 2012/0203428 | A1 | 8/2012 | Choi et al. |
| 2015/0166062 | A1* | 6/2015 | Johnson ................ B60W 10/20 701/41 |
| 2015/0266489 | A1 | 9/2015 | Solyom et al. |
| 2017/0066449 | A1 | 3/2017 | Lee et al. |
| 2017/0124781 | A1* | 5/2017 | Douillard ......... G08G 1/096816 |
| 2018/0079424 | A1* | 3/2018 | Myers .................... G06N 7/005 |
| 2018/0186210 | A1 | 7/2018 | Noll et al. |
| 2018/0307236 | A1 | 10/2018 | Reed |
| 2019/0113916 | A1* | 4/2019 | Guo .................. B60W 60/0015 |
| 2020/0031183 | A1* | 1/2020 | Kim ..................... B60C 11/246 |
| 2020/0089243 | A1* | 3/2020 | Poeppel ............ B60W 50/0097 |
| 2020/0151067 | A1* | 5/2020 | Golov ................. G06F 12/0864 |
| 2020/0226921 | A1* | 7/2020 | Higuchi ............... G08G 1/0112 |

FOREIGN PATENT DOCUMENTS

| | | |
|---|---|---|
| EP | 1582382 | 10/2005 |
| KR | 100733873 | 7/2007 |
| KR | 20090047249 | 5/2009 |
| WO | WO 2010019045 | 2/2010 |

OTHER PUBLICATIONS

DK Office Action in Danish Appln. No. PA201970135, dated Jun. 25, 2020, 2 pages.
PCT International Search Report and Written Opinion in International Appln. No. PCT/US2020/015372, dated Jul. 21, 2020, 22 pages.
DK 1st Office Action in Danish Appln. No. PA201970135, dated May 16, 2019, 9 pages.
DK 2nd Office Action in Danish Appln. No. PA201970135, dated Oct. 18, 2019, 5 pages.
DK 3rd Office Action in Danish Appln. No. PA201970135, dated Jun. 10, 2020, 3 pages.
DK 4th Office Action in Danish Appln. No. PA201970135, dated Jul. 13, 2020, 2 pages.
[No Author Listed], "J3016: Taxonomy and Definitions for Terms Related to On-Road Motor Vehicle Automated Driving Systems" SAE International, Sep. 2016, 30 pages.
DK 1rst Office Action in Danish Appln. No. PA201970135, dated May 16, 2020, 9 pages.
PCT Invitation to Pay Additional Fees in International Appln. No. PCT/US2020/015372, dated May 18, 2020, 13 pages.
DK Office Action in Danish Appl. No. 201970135, dated Jun. 10, 2020, 3 pages.
PCT International Preliminar Report on Patentability in International Appln. No. PCT/US2020/015372, dated Aug. 12, 2021, 14 pages.

* cited by examiner

DETECTING ROAD ANOMALIES

CROSS-REFERENCE TO RELATED APPLICATION

This application claims priority to U.S. Provisional Patent Application No. 62/797,895, filed Jan. 28, 2019, and Danish Patent Application No. PA201970135, filed Feb. 27, 2019, the entire contents of which are incorporated herein by reference.

FIELD OF THE INVENTION

This description relates to systems and methods for detecting and communicating road anomalies by autonomous vehicles.

BACKGROUND

Autonomous vehicles can be used to transport people and/or cargo (e.g., packages, objects, or other items) from one location to another. As an example, an autonomous vehicle can navigate to the location of a person, wait for the person to board the autonomous vehicle, and navigate to a specified destination (e.g., a location selected by the person). As another example, an autonomous vehicle can navigate to the location of cargo, wait for the cargo to be loaded into the autonomous vehicle, and navigate to a specified destination (e.g., a delivery location for the cargo).

SUMMARY

Techniques are provided for an apparatus, comprising a processing unit and a plurality of sensors coupled to a vehicle, where at least one of the plurality of sensors is positioned on an undercarriage of the vehicle. The plurality of sensors may be configured to detect variations of a navigable surface on which the vehicle is traveling. The plurality of sensors may also be configured to generate information corresponding to the variations of the navigable surface. The plurality of sensors may also be configured to transmit the information corresponding to the variations of the navigable surface to the processing unit. The information collected by the plurality of sensors may be used to augment a driving capability of the vehicle.

In some implementations of the apparatus, at least one of the plurality of sensors is in contact with the navigable surface.

In some implementations of the apparatus, the processing unit may process, using one or more machine learning algorithms, the information corresponding to the variations that is received from the plurality of sensors.

In some implementations of the apparatus, the processing unit may process, using one or more machine learning algorithms comprising at least one support vector machine algorithm, the information corresponding to the variations that is received from the plurality of sensors.

In some implementations of the apparatus, the processing unit may process, using one or more machine learning algorithms comprising at least one neural network algorithm, the information corresponding to the variations that is received from the plurality of sensors.

In some implementations of the apparatus, the processing unit may transmit the information collected by the plurality of sensors to a remote server. The remote server may exchange information with other vehicles connected to the remote server.

In some implementations of the apparatus, the processing unit may transmit the information collected by the plurality of sensors to one or more other vehicles that are in a vicinity of the vehicle corresponding to the plurality of sensors.

In some implementations of the apparatus, augmenting the driving capability of the vehicle may comprise determining, by using the processing unit, that the navigable surface has a level of traction that is below a threshold. In response to the determination, a control unit may reduce the speed of the vehicle.

In some implementations of the apparatus, augmenting the driving capability of the vehicle may comprise detecting, by using the processing unit, an obstacle on the road according to the information collected by the plurality of sensors. In response to the detection, a control unit may adjust the steering of the vehicle to avoid the obstacle.

In some implementations of the apparatus, the processing unit may be configured to detect lane demarcations on a surface of the road according to the information collected by the plurality of sensors, where the lane demarcations are distinguishable from the navigable surface according to the information collected by the plurality of sensors. The processing unit may also be configured to generate a map of lane lines on the surface of the road using the lane demarcations.

In some implementations of the apparatus, augmenting the driving capability of the vehicle may comprise determining, by using the processing unit, that the variations of the navigable surface occur at periodic intervals. In response to the determination, a control unit may steer the vehicle in a direction towards a section of the road away from the variations on the surface of the road.

In some implementations of the apparatus, augmenting the driving capability of the vehicle may comprise determining, by using the processing unit, that the variations of the navigable surface occur at periodic intervals. In response to the determination, a control unit may reduce the speed of the vehicle.

In some implementations of the apparatus, augmenting the driving capability of the vehicle may comprise determining, by using the information collected by the plurality of sensors, a slip ratio of a surface of the road. Augmenting the driving capability of the vehicle may also comprise estimating a friction value of the surface of the road in response to the determination. Augmenting the driving capability of the vehicle may also comprise adjusting the driving capability of the vehicle in accordance with the estimated friction value.

In some implementations of the apparatus, augmenting the driving capability of the vehicle may comprise determining, by using the information collected by the plurality of sensors, a slip ratio of a surface of the road. Augmenting the driving capability of the vehicle may also comprise estimating a friction value of the surface of the road in response to the determination. Augmenting the driving capability of the vehicle may also comprise adjusting the driving capability of the vehicle in accordance with the estimated friction value. Augmenting the driving capability of the vehicle may also comprise determining, by using the estimated friction value, a type of material used for a surface of the road. Augmenting the driving capability of the vehicle may also comprise adjusting a speed of the vehicle in accordance with type of material used for the surface of the road.

In some implementations of the apparatus, augmenting the driving capability of the vehicle may comprise performing a look up of a friction table using the information collected by the plurality of sensors. Augmenting the driving capability of the vehicle may also comprise, in response to the look up, estimating a friction value of a surface of the road. Augmenting the driving capability of the vehicle may also comprise adjusting the driving capability of the vehicle in accordance with the estimated friction value.

In some implementations of the apparatus, the plurality of sensors may comprise a first sensor and a second sensor. The first sensor may process information of a first type and the second sensor may process information of a second type that is different than the first type.

In some implementations of the apparatus, the processing unit may generate, by using the information collected by the plurality of sensors, a height map of a surface of the road.

In some implementations of the apparatus, the processing unit may be configured to determine, by using the information collected by the plurality of sensors, a condition of a surface of the road. The processing unity may also be configured to classify the determined condition of the surface of the road as having one or more of snow, ice, rain or obstacles.

In some implementations of the apparatus, augmenting the driving capability of the vehicle may comprise receiving, from one or more neighboring vehicles, additional information about variations of the navigable surface. Augmenting the driving capability of the vehicle may also comprise comparing the information collected by the plurality of sensors to the additional information received from the one or more neighboring vehicles. Augmenting the driving capability of the vehicle may also comprise computing a confidence measure in the information collected by the plurality of sensors in accordance with the comparison.

In some implementations of the apparatus, the plurality of sensors may comprise a sensor array. The sensor array may include sensors positioned in one or more rows.

In some implementations of the apparatus, the plurality of sensors may comprise one or more sensors embedded in at least one of a tire of the vehicle, or a suspension of the vehicle.

Techniques are provided for an autonomous vehicle, comprising at least one sensor positioned on an underside of the autonomous vehicle, the at least one sensor making physical contact with a surface of a road on which the autonomous vehicle is traveling. The autonomous vehicle also comprising a controller-circuit. The controller-circuit may be configured to receive sensor data from the at least one sensor. The controller-circuit may also be configured to detect a road condition based on the sensor data. The controller-circuit may also be configured to determine whether to adjust a driving function of the autonomous vehicle in response to the road condition. The controller-circuit may also be configured to, in accordance with a determination to adjust the driving function of the autonomous vehicle, adjust the driving function of the autonomous vehicle.

Techniques are provided for a method of operating an autonomous vehicle using an apparatus. The apparatus may comprise a processing unit and a plurality of sensors coupled to a vehicle, where at least one of the plurality of sensors is positioned on an undercarriage of the vehicle. The plurality of sensors may be configured to detect variations of a navigable surface on which the vehicle is traveling. The plurality of sensors may also be configured to generate information corresponding to the variations of the navigable surface. The plurality of sensors may also be configured to transmit the information corresponding to the variations of the navigable surface to the processing unit. The information collected by the plurality of sensors may be used to augment a driving capability of the vehicle.

Techniques are provided for a system comprising a vehicle, a plurality of sensors coupled to the vehicle, and a first device with one or more processors and memory. The first device may perform operations to detect road anomalies and adjust the driving capability of the vehicle using the actions mentioned above.

Techniques are provided for a non-transitory computer-readable medium encoding instructions operable to cause a data processing apparatus to detect road anomalies and adjust the driving capability of a vehicle using the actions mentioned above.

In an aspect, a method of operating an autonomous vehicle comprises determining a direction of travel of the autonomous vehicle; receiving, from a processing circuit, information about a section of a navigable surface in the direction of travel; receiving, from a remote system, information about variations of the section of the navigable surface, wherein the information was collected previously by one or more other vehicles; and based on the received information, adjusting, using a control circuit, an operation of the autonomous vehicle.

In an aspect, an apparatus, comprises an actuator coupled to a vehicle, the actuator having a first and second end, where the first end pivots with respect to the vehicle; a tensioning device coupled to the actuator; a shield coupled to the actuator; a brush head coupled to the second end of the actuator, the brush head comprising bristles; and a plurality of sensors; wherein the actuator is configured to bring the bristles into contact with a navigable surface; and wherein the one or more sensors are configured to detect variations of the navigable surface after the brush head is brought into contact with a navigable surface.

These and other aspects, features, and implementations can be expressed as methods, apparatus, systems, components, program products, means or steps for performing a function, and in other ways.

These and other aspects, features, and implementations will become apparent from the following descriptions, including the claims.

DETAILED DESCRIPTION

Figure 1:
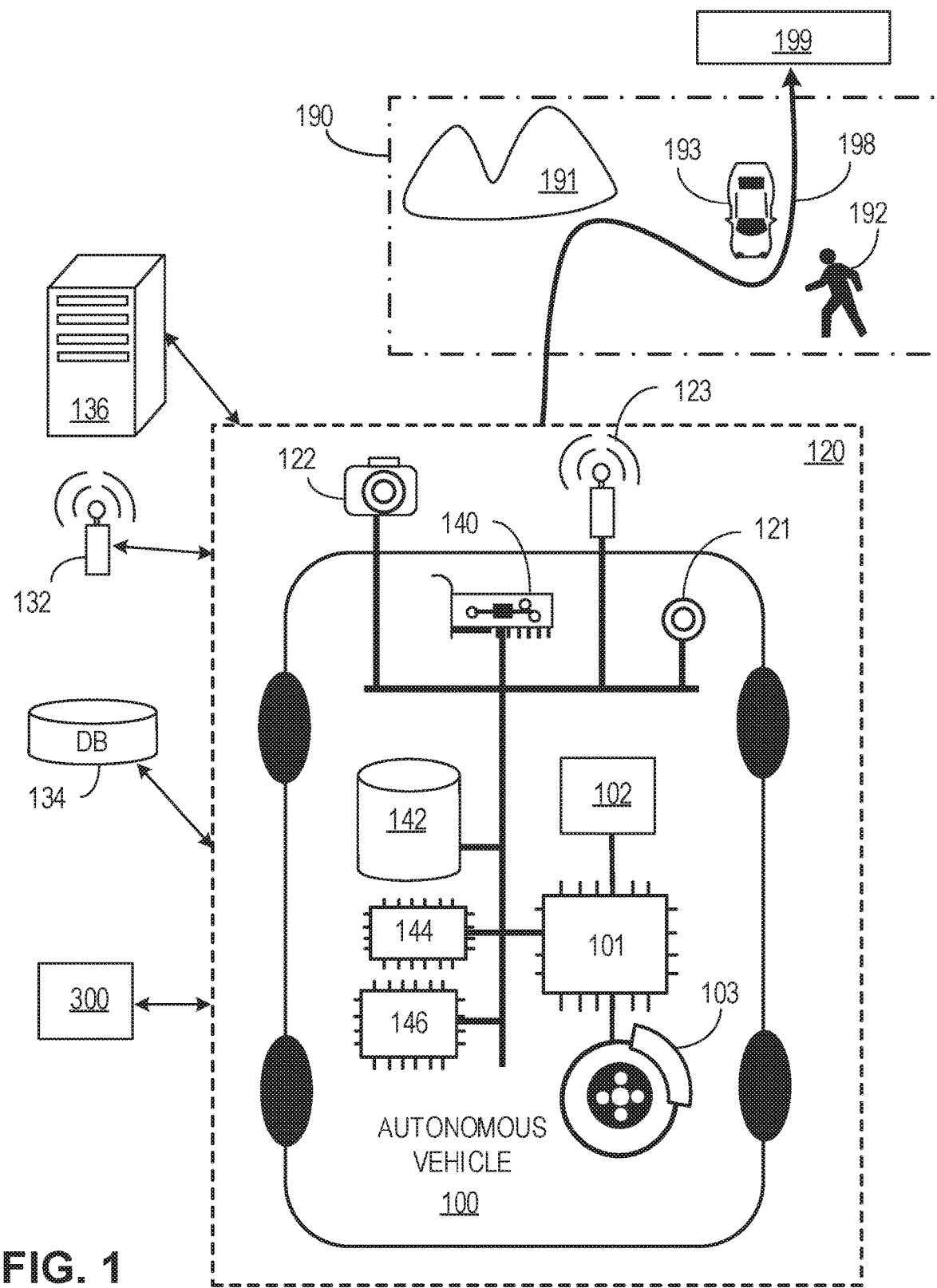
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Detecting Anomalies with an Autonomous Vehicle
8. Controlling the Operation of One or More Autonomous Vehicles Based on Detected Anomalies
9. Example Processes for Detecting Anomalies with an Autonomous Vehicle General Overview An anomaly detection system can be coupled to one or more autonomous vehicles to detect one or more variations of a navigable surface, such as a road. For example, the anomaly detection system uses one or more sensors to detect the one or more variations of the navigable surface. These detected variations of the navigable surface may imply, for example, one or more navigable surface conditions (e.g., water on the surface, snow on the road, potholes, etc.). In some examples, based on the detected variations of the navigable surface, the operation of the one or more autonomous vehicles may be modified. In some examples, based on the detected variations of the navigable surface, a digital map that the one or more autonomous vehicles have access to can be modified, and, based on the modification, the paths (e.g., position in road lane, road lane, road, etc.) of the one or more autonomous vehicles may be modified and/or the operation of the one or more autonomous vehicles may be modified.

In some embodiments, the output (i.e., the detected variations of the navigable surface) of the one or more sensors of the anomaly detection system are sent to a computer system that dynamically controls the one or more autonomous vehicles. The computer system may determine, based on the sensors' output, one or more navigable surface conditions. In an example, based on the determination, the computer system may modify the operation of an autonomous vehicles. In another example, based on the determination, the computer system may update a map that an autonomous vehicle has access to so that it includes the navigable surface conditions. The computer system may communicate this updated map to other autonomous vehicles. In some embodiments, the output of the one or more sensors is sent to a computer system coupled to the autonomous vehicle. In some embodiments, the output of the one or more sensors is sent, through a communications network, to a centralized computer system.

The subject matter described herein can provide several technical benefits. For instance, some implementations can improve the safety, efficiency, and effectiveness of a fleet of autonomous vehicles as a whole, as well as autonomous vehicles individually. As an example, by modifying the operation of an autonomous vehicle in response to a detected navigable surface condition, for example by slowing the vehicle down when snow on the road is detected, the vehicle is less likely to be involved in an accident, and, thus, the system is more effective in getting the vehicle and its passengers and/or cargo safely to its destination. Further, the system provides an effective and efficient technique for a fleet of vehicles to avoid hazards. For example, when a one or more hazards are detected, the paths of autonomous vehicles can be modified, such that they avoid a road/lane with one or more detected hazards. Thus, less damage is likely to be done to those vehicles, they are less likely to be involved in an accident, and are more likely to get to their destination. Further, the modifications to the one or more vehicles' operations and/or paths can be performed in an automated manner.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "navigable surface" or a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" or a "navigable surface" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

As used herein, a "road anomaly" or "anomaly of a navigable surface" is any detected road condition, any detected road damage or cavities, or any detection of any obstacles in the road. Road conditions may include, for example, water/moisture on the road, ice on the road, and/or snow on the road. Road damage or cavities may include, for example, potholes and/or rumble strips.

A used herein, "rumble strips," also known as sleeper lines, alert strips, audible lines, sleepy bumps, wake up calls, growlers, drift lines, and drunk bumps, are a road safety feature usually found on the shoulder of some road and/or in the road lines of some roads.

A used herein, an "aspect" of a navigable surface or road is any inherent feature of a navigable surface or road. For example, an aspect of a road may include its friction value in ideal/dry, wet, snowy, and/or icy condition. For example, an aspect of road may include the material it is made from.

As used herein, a "desired driving capability" is any instruction to adjust the control of the autonomous vehicle. Such control adjustment may include, for example, steering to the left, steering to the right, letting off the throttle, opening the throttle, braking, engaging the anti-lock braking system (ABS) of the vehicle, and/or having the vehicle follow a certain route.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

As used herein, machine learning refers to the use of any supervised, semi-supervised, or unsupervised learning algorithm used to create a mathematical model. In an embodiment, in determining a type of anomaly, classification type supervised learning algorithms are used, such as, for example, naive Bayes, support vector machines, and neural networks. In an embodiment, the mathematical models formed from the algorithms are predictive models.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are a Global Positioning System (GPS), inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces of communication devices 140 transmit data collected from sensors 121 or other data related to the operation of AV 100 to the remotely located database 134. In an embodiment, communication interfaces of communication devices 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing processors 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing processors 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
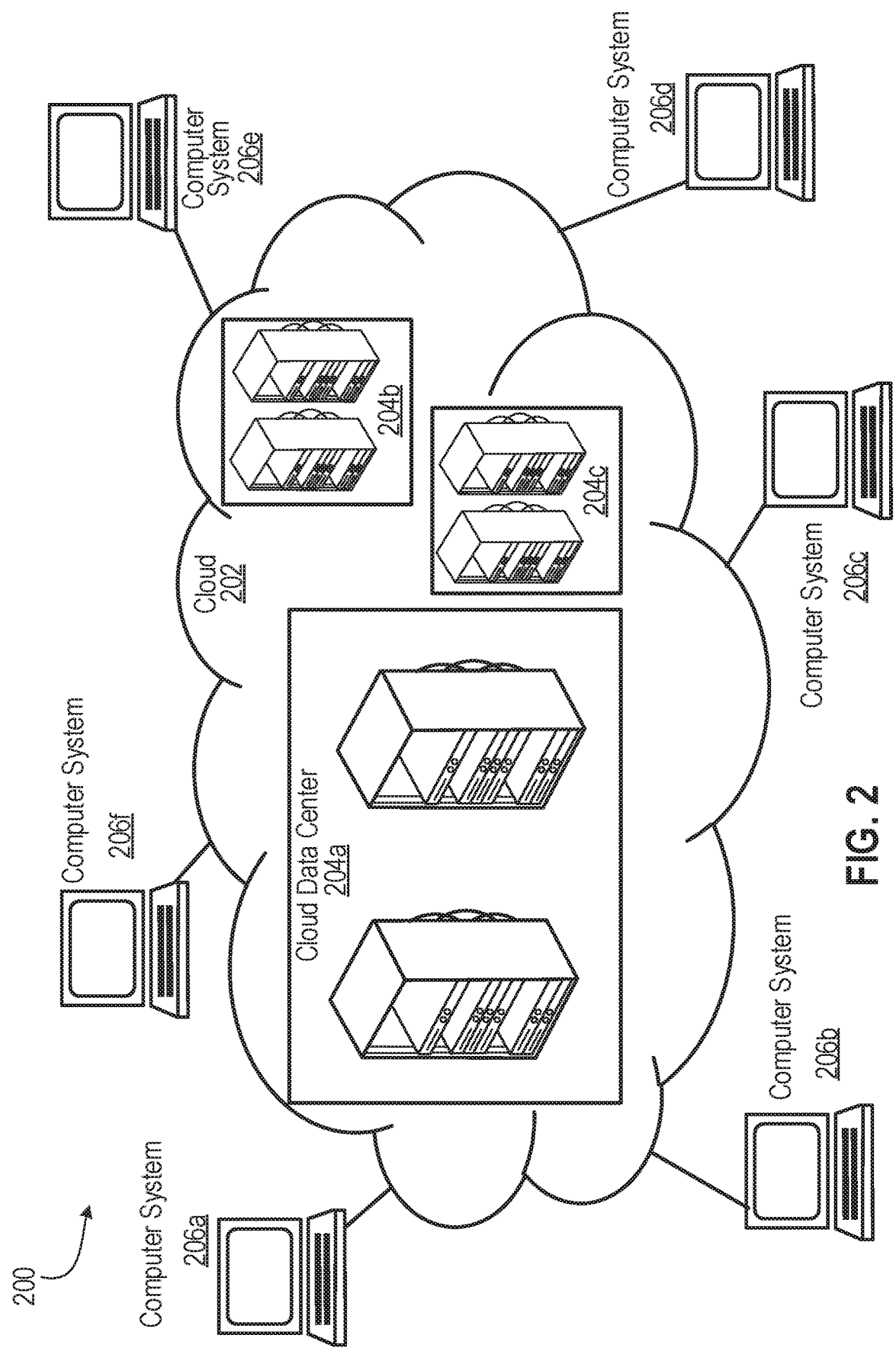
FIG. 2 illustrates an exemplary "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
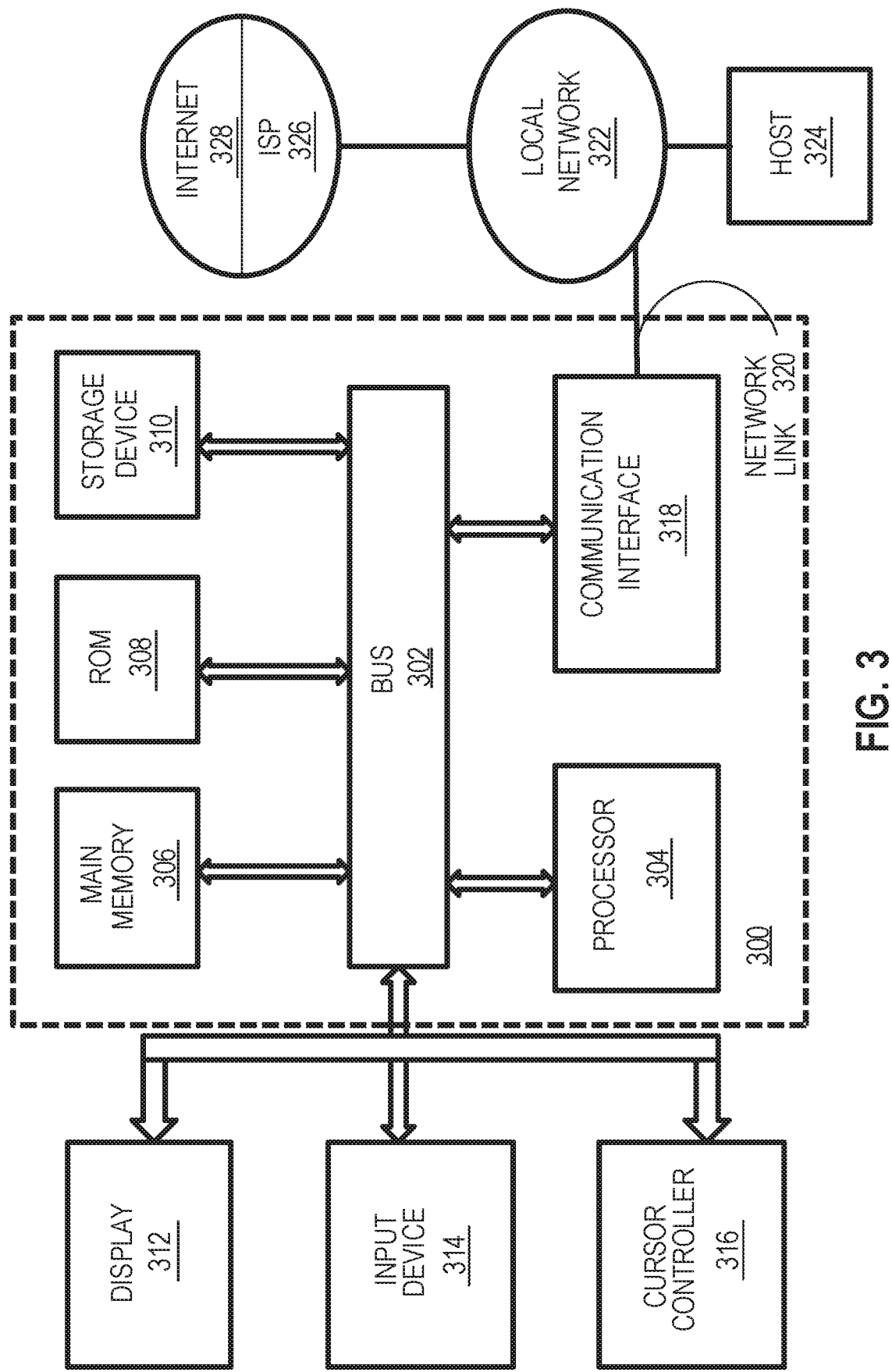
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network link 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
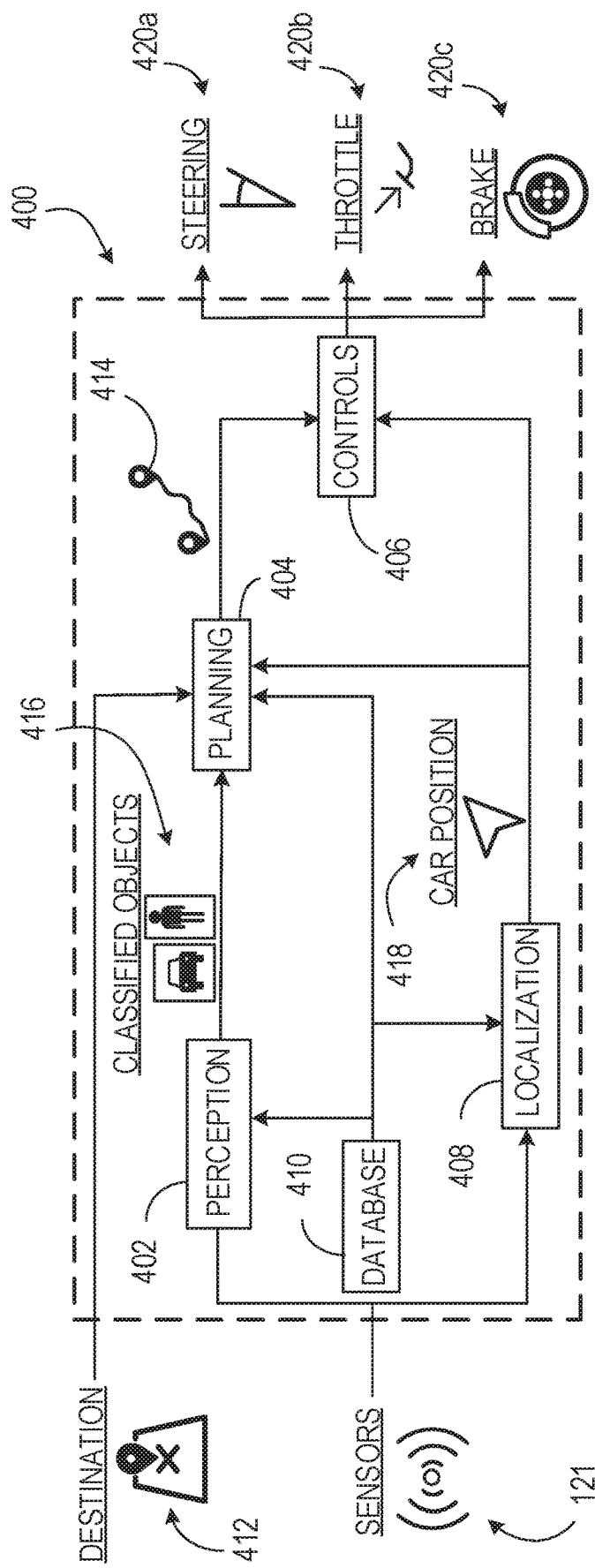
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
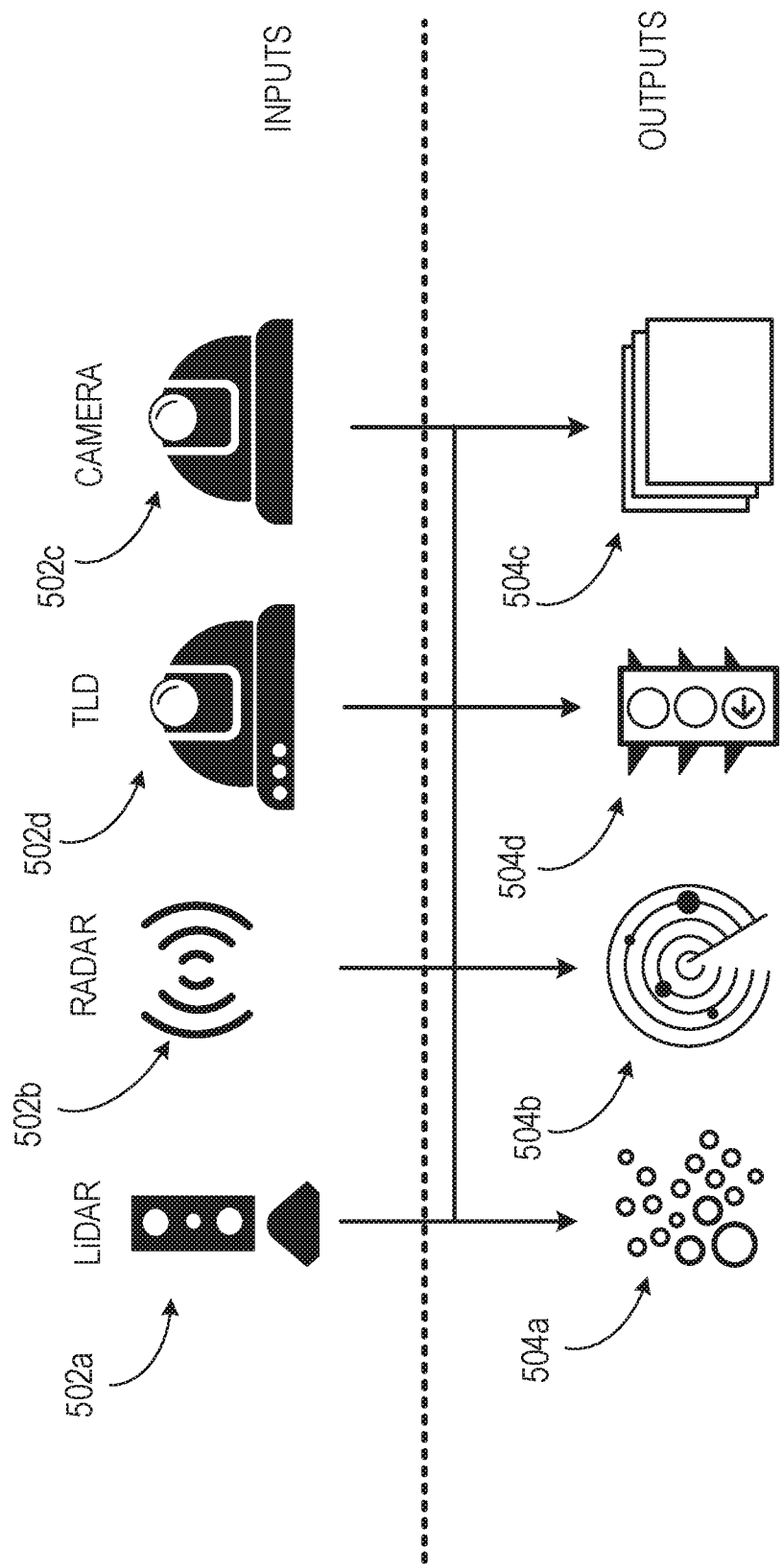
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
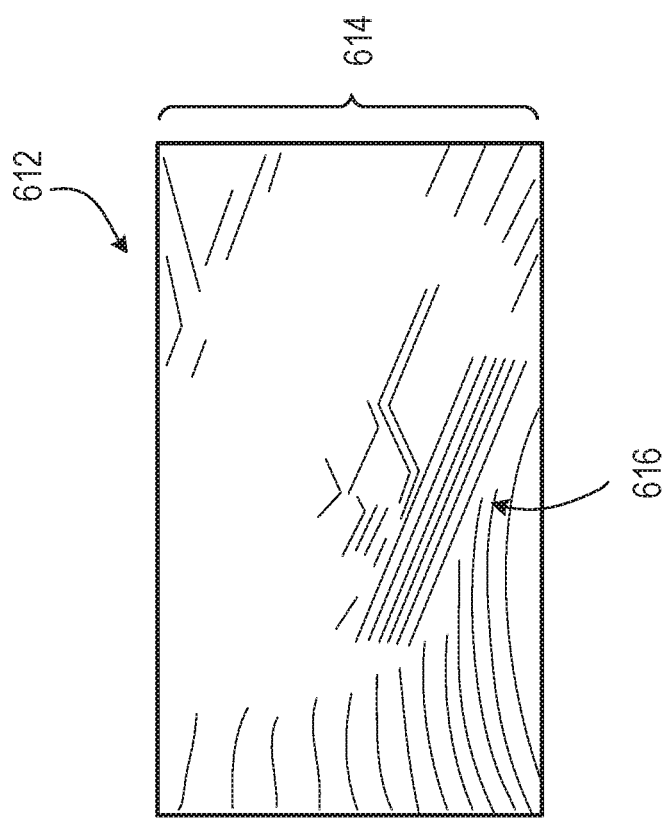
FIG. 6 shows an example of a LiDAR system.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
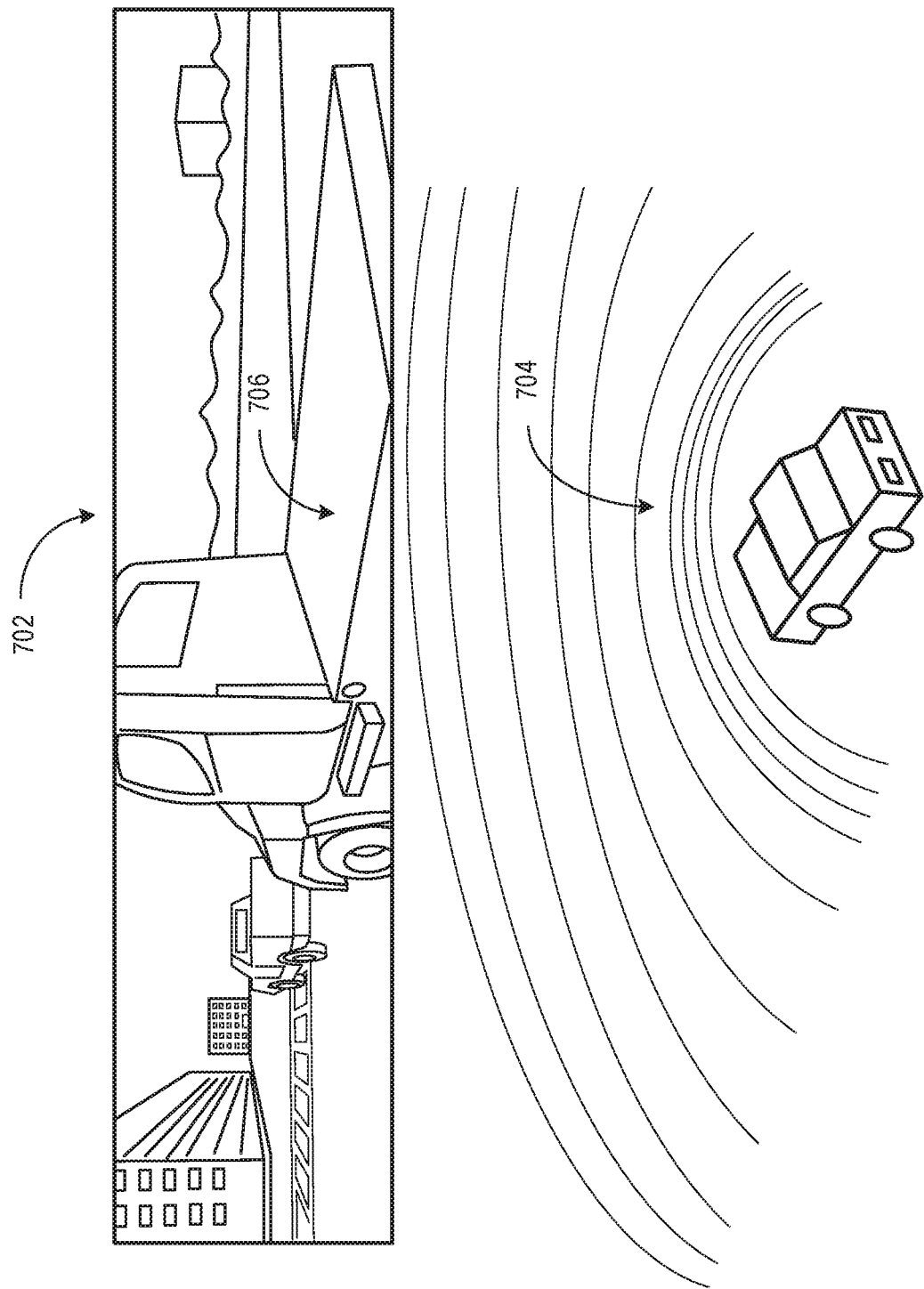
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
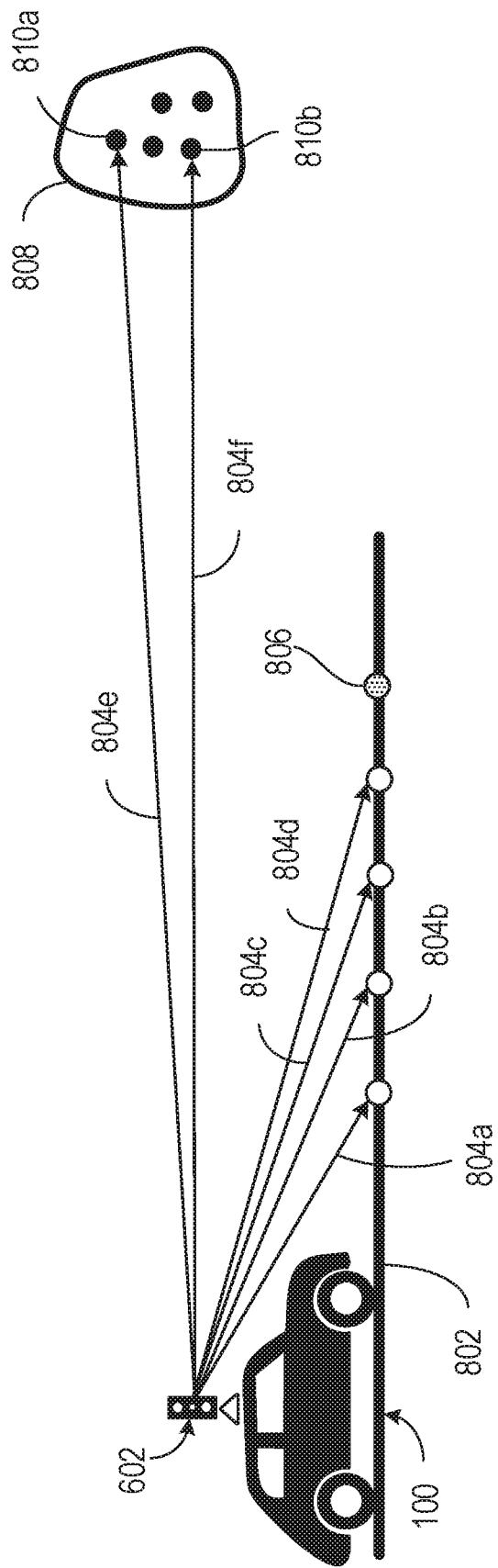
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
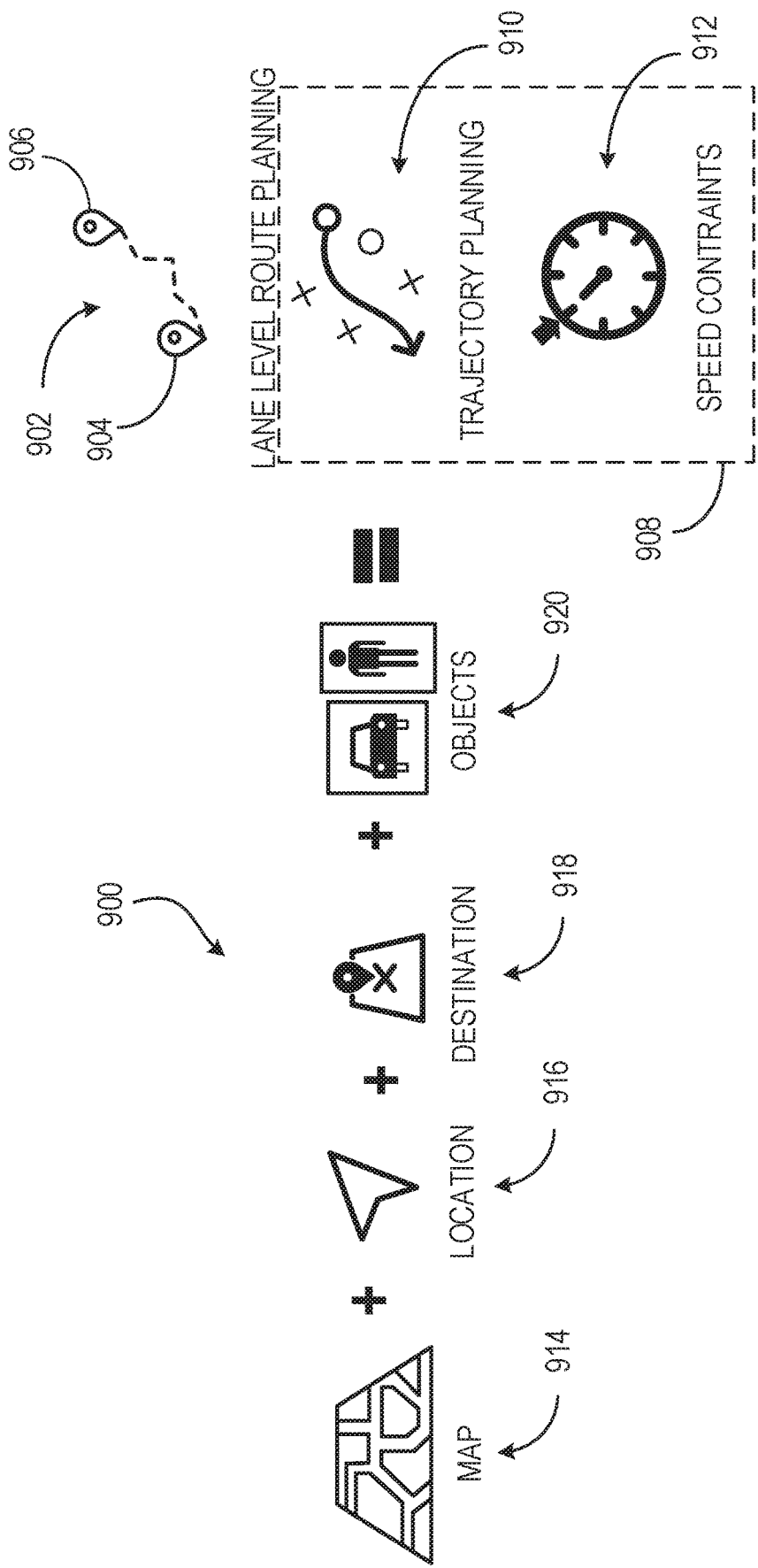
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or un-expected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
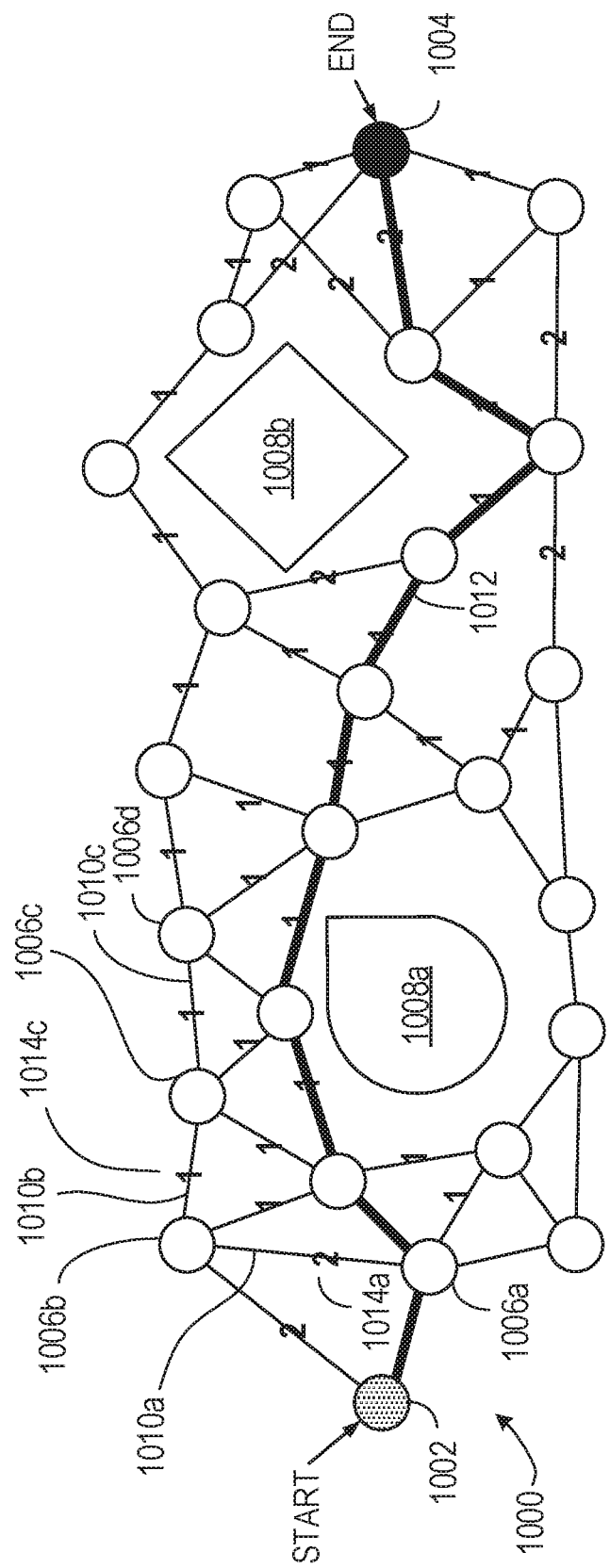
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g., in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010a-c has an associated cost 1014a-b. The cost 1014a-b is a value that represents the resources that will be expended if the AV 100 chooses that edge. A typical resource is time. For example, if one edge 1010a represents a physical distance that is twice that as another edge 1010b, then the associated cost 1014a of the first edge 1010a may be twice the associated cost 1014b of the second edge 1010b. Other factors that affect time include expected traffic, number of intersections, speed limit, etc. Another typical resource is fuel economy. Two edges 1010a-b may represent the same physical distance, but one edge 1010a may require more fuel than another edge 1010b, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
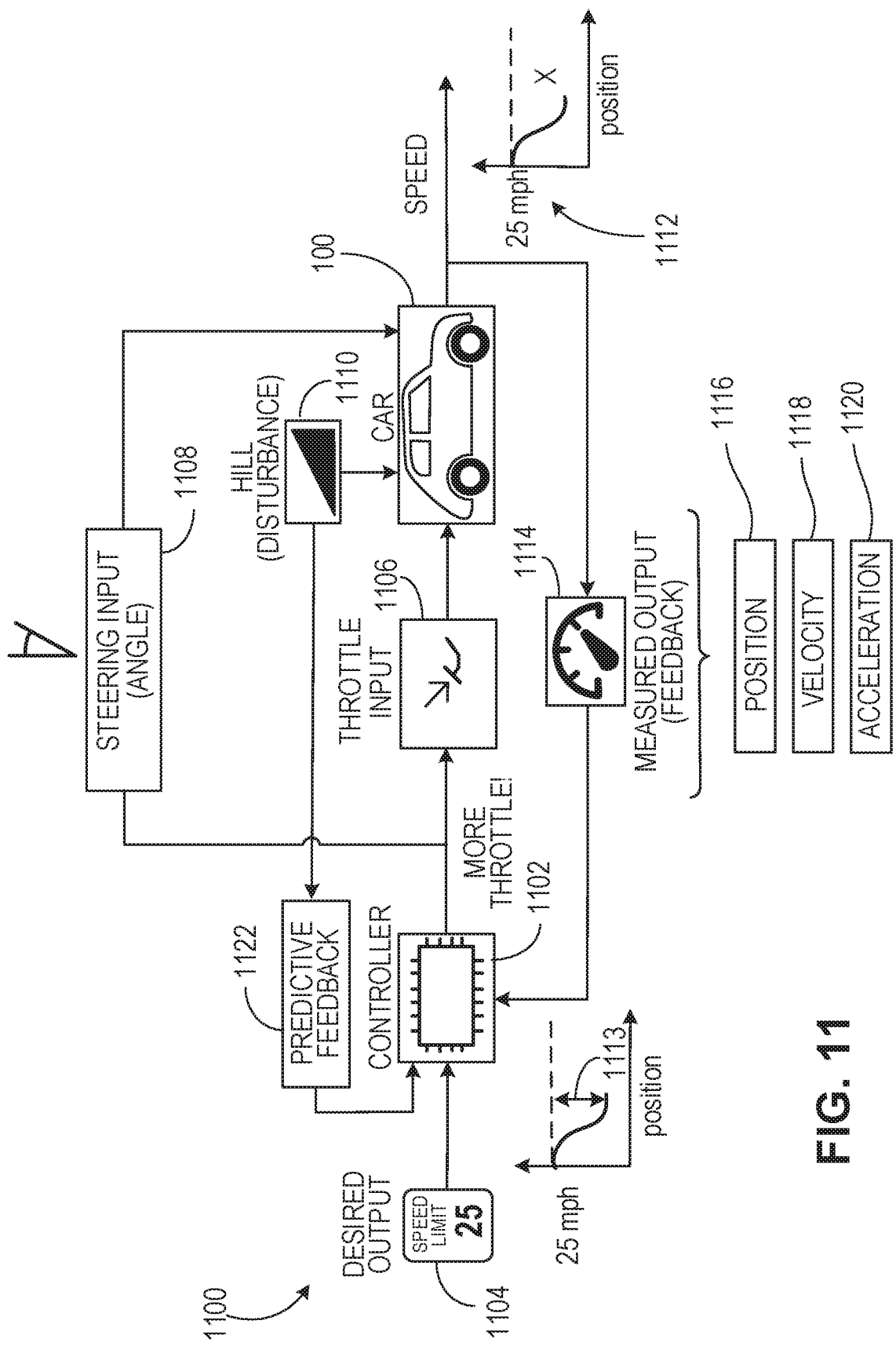
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1508, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
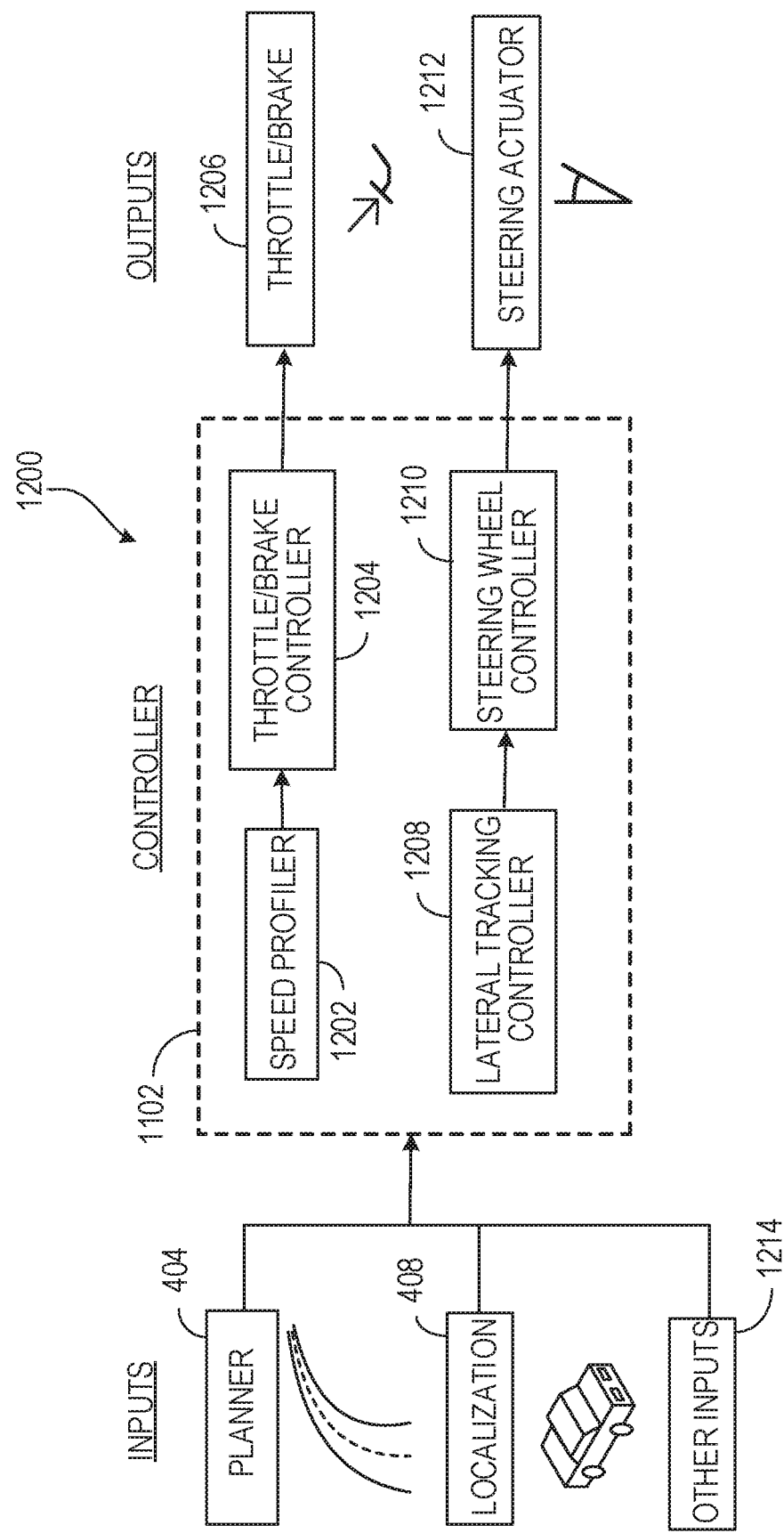
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. In an embodiment, a localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Detecting Anomalies with an Autonomous Vehicle

In some embodiments, an anomaly detection system is coupled to one or more autonomous vehicles. For example, in an embodiment the anomaly detection system includes one or more sensors, including for example, a plurality of sensors which, for example, detects variations in a navigable surface, such as a road. The anomaly detection system can be coupled to a vehicle such that the one or more sensors are positioned on an undercarriage of the one or more autonomous vehicles.

Figure 13:
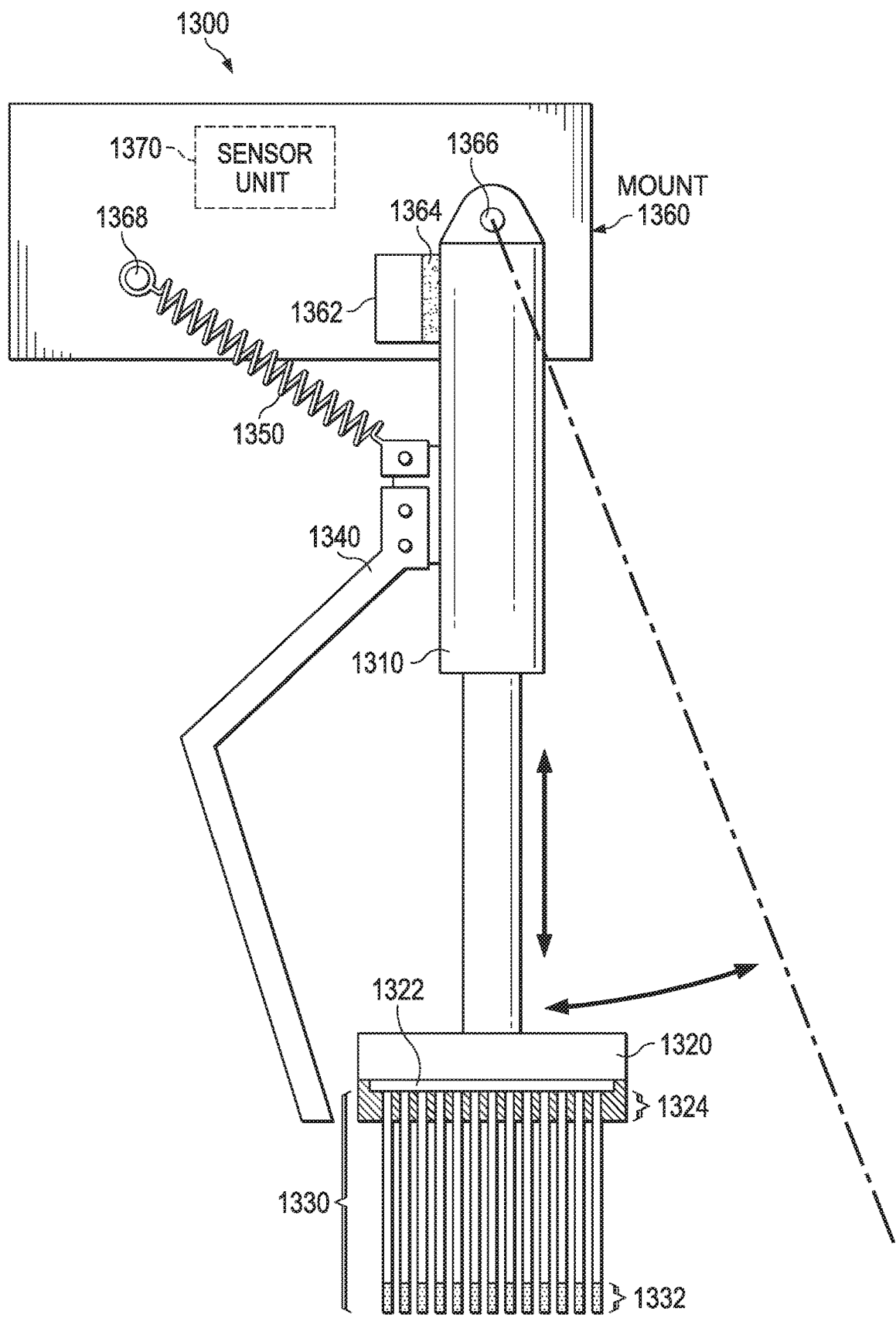
FIG. 13 shows an example of an anomaly detection system.

FIG. 13 illustrates an example anomaly detection system 1300 in a first position. As shown, the anomaly detection system 1300 includes an actuator 1310, a brush head 1320 to which bristles 1330 are joined by an adhesive layer 1324, a shield 1340, a tensioning device 1350, a mount 1360, and a sensor unit 1370.

The mount 1360 includes a stopper 1362, a first pivot 1366, and a second pivot 1368. The first pivot 1366 supports the actuator 1310 and allows the actuator 1310 to rotate about the first pivot 1366. However, the stopper 1362, which includes a cushioning pad 1364, prevents the actuator 1310 from rotating in a clockwise direction once the actuator 1310 comes into contact with the stopper 1362. The second pivot 1368 supports one end of the tensioning device 1350 and allows the tensioning device 1350 to rotate about the second pivot 1368. The other end of the tensioning device 1350 is connected to the actuator 1310. The connection between the tensioning device 1350 and the actuator 1310 limits the rotation of the tensioning device 1350 about the second pivot 1368. The mount 1360 may also house a sensor unit 1370.

The cushioning pad 1364 absorbs impact occurring between the actuator 1310 and stopper 1362. The cushioning pad 1364 is made from various materials. Such materials include, for example, elastomers, such as natural or synthetic rubber, and plastic. The cushioning pad 1364 is coupled to the stopper 1362 through adhesive or mechanical means.

In an embodiment, the tensioning device 1350 is a spring. However, in other embodiments, the tensioning device is a band or tube made from an elastomer, such as natural or synthetic rubber. The tensioning device 1350 is connected to the actuator 1310 through, for example, a bracket. In some embodiments, the connection between the tensioning device 1350 and the actuator 1310 is a pivot. In some embodiments, the tensioning device 1350 is in the same plane as the actuator 1310. The tensioning device 1350 provides a force on the actuator 1310. This force can help keep the actuator 1310 in the first position, i.e. in contact with the stopper 1362. This force brings the actuator 1310 back to the first position after it has moved away from such a position due to various circumstances, e.g., after an object on a road has made contact with the shield 1340 and caused the actuator 1310 to rotate counter-clockwise away from the stopper 1362. The tensioning device 1350 also helps to stabilize a new position of the actuator 1310 by providing an opposing force to a friction force between the bristles 1330 and a navigable surface, such as a road.

In this embodiment, the actuator 1310 is a hydraulic cylinder. However, in other embodiments, the actuator 1310 is a different type of linear actuator, such as a pneumatic actuator or an electro-mechanical actuator. In an embodiment, the actuator 1310, to which the brush head 1320 is connected, extends and retracts. For example, the actuator 1310 extends so as to bring the bristles 1330 into contact with a navigable surface. The actuator 1310 rotates around the first pivot 1366. However, when the actuator 1310 is in the first position, i.e., when it is in contact with the stopper 1362, the actuator 1310 is only free to rotate in a counter-clockwise manner.

In this embodiment, a shield 1340 is coupled to the actuator 1310 through, for example, a bracket. Shield 1340 protects the actuator 1310 from coming into contact with debris or other objects that may be present on a navigable surface and which are not able to pass under the brush head 1320. Shield 1340 is angled so that it directs debris or other objects underneath the brush head 1320 and bristles 1330. Ideally, shield 1340 is coupled to the side of the actuator 1310 that faces the front of an autonomous vehicle, such that it is primarily facing the direction of travel. In an embodiment, shield 1340 is made of a metal. In an embodiment, shield 1340 is made of a plastic.

In this embodiment, the brush head 1320 is connected to a lower portion of the actuator 1310. In an embodiment, this connection is mechanical; however, in other embodiments this connection is an adhesive connection or a magnetic connection. In an embodiment, brush head 1320 includes a bristle strain/pressure sensor 1322 and a layer of adhesive 1324 in which one end of each of the bristles 1330 are disposed. Ideally, the strain/pressure sensor is placed between the brush head 1320 and the bristles 1330. This effectively makes the bristles 1330 and/or brush head 1320 a friction sensor as the bristles 1330 comes into contact with a navigable surface. Although in this embodiment, the bristles 1330 are joined to the brush head 1320 through an adhesive layer 1324, in other embodiments they are joined through other means, such as through a mechanical connection. In an embodiment, in addition to joining the bristles 1330 with the brush head 1320, an adhesive layer allows the bristles to be secured such that they are spread apart from one another and, in some embodiments, arranged in rows.

In this embodiment, bristles 1330 end in one or more bristle sensors 1332. Bristle sensors 1332 include, for example, moistures sensors and/or temperature sensors. In some embodiments, bristle sensors 1332 are humidity sensors that can measure both temperature and moisture. Although it is depicted that each bristle ends in a sensor, this need not be the case. In some embodiments, only one bristle of bristles 1330 ends in a sensor. In other embodiments, more than one bristle of bristles 1330 ends in a sensor. In an embodiment, one or more of the bristles 1330 may be hollow so as to allow one or more wires (not shown) to run through the bristle and connect to the one or more sensors. In an embodiment, the one or more bristles ending in a sensor are insulated wires. In an embodiment, the ends of at least the one or more bristles of the bristles 1330 ending in a sensor are coated with a protective layer so as to protect the one or more sensors from damage as they come into contact with a navigable surface. In an embodiment, a different protective layer is used for the ends of bristles ending with a temperature sensor than those that end with a moisture and/or humidity sensor. In such case, the protective layer for the ends of bristles ending in a moisture sensor and/or humidity sensor is permeable to water in order to allow the detection of moisture. In contrast, the protective layer for the ends of bristles ending in a temperature sensor is non-permeable in order to better protect the temperature sensor.

Figure 19:
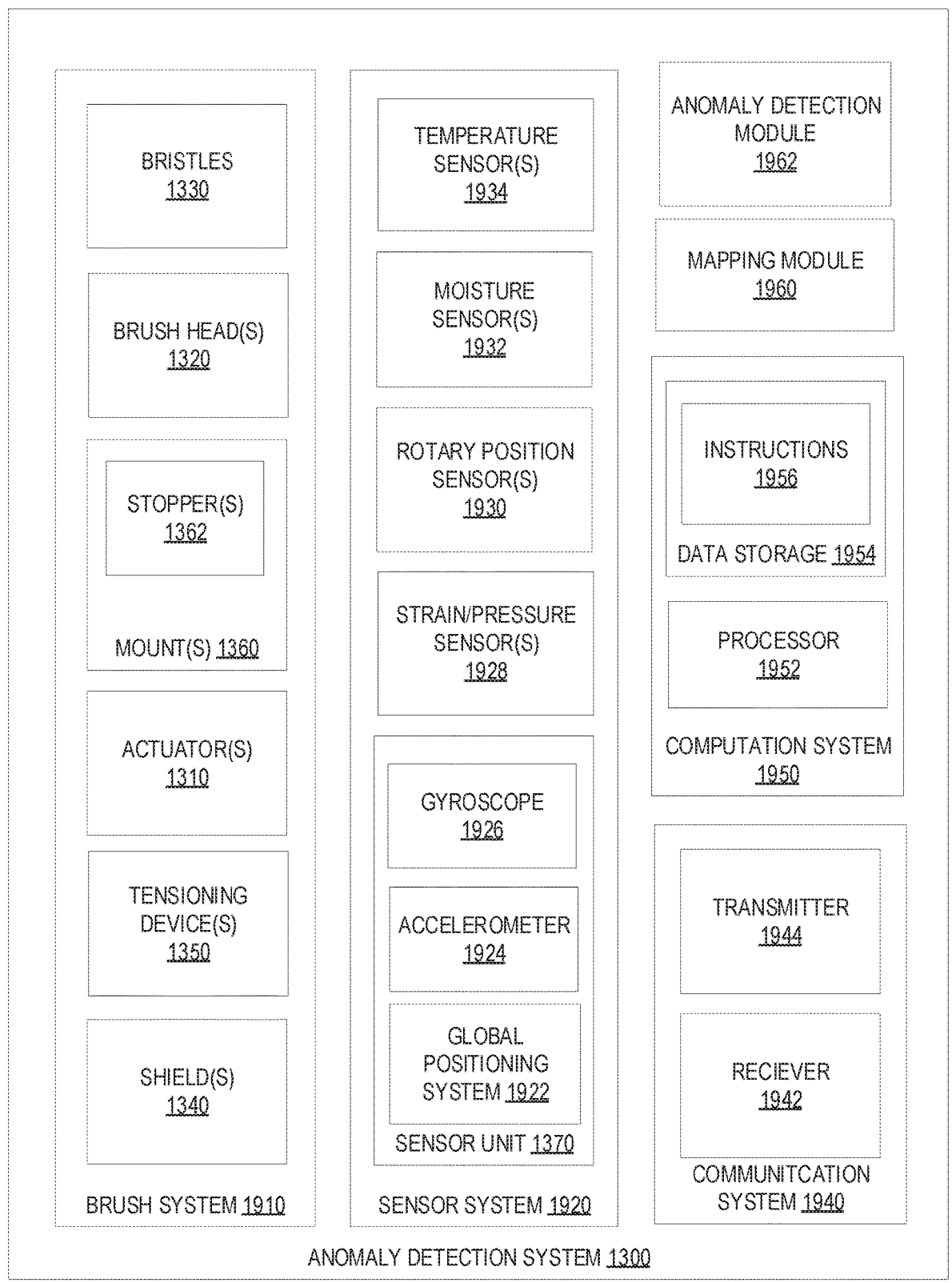
FIG. 19 shows an example block diagram of an anomaly detection system and its subsystems.

In this embodiment, the anomaly detection system 1300 includes a number of sensors to help detect variations in a navigable surface. These sensors include, for example, a bristle strain/pressure sensor 1322 and one or more bristle sensors 1332. As discussed above, in an embodiment, the bristle strain/pressure sensor 1322 is positioned between the bristles 1330 and the brush head 1320. As shown, the bristle strain/pressure sensor is bonded to the brush head 1320 with an adhesive. In an embodiment, the bristle strain/pressure sensor 1322 is made up of or part of the strain/pressure sensor(s) 1928 as shown in FIG. 19. In an embodiment, the bristle strain/pressure sensor 1322 is a strain gauge. In an embodiment, the bristle strain/pressure sensor 1322 is a piezoresitor. The bristle strain/pressure sensor detects the pressure, force, and/or tension that is exerted on the brush head 1320 and/or bristles 1330. In an embodiment, the strain/pressure that is exerted on brush head 1320 and/or bristles 1330 is due to a friction force between the bristles 1330 and a navigable surface. The outputs of the bristle strain/pressure sensor 1322 are used in determining a friction factor of the navigable surface, which, in turn, is used in determining if there is water, ice, and/or snow on the navigable surface. The outputs of the bristle strain/pressure sensor 1322 may also be used in determining if there are any cavities in the navigable surface, such as potholes or rumble strips.

As discussed above, bristle sensors 1332 are one or more temperature sensors, one or more moisture sensors, and/or one or more humidity sensors. In an embodiment, the bristle sensors 1332 are one or more of the sensors 121 as shown in FIG. 1 and FIG. 4. The one or more temperature sensors detect a temperature of a navigable surface, a temperature near a navigable surface, changes in temperature of a navigable surface, and/or changes in temperature near a navigable surface. In an embodiment, the outputs of the one or more temperature sensors are used in determining if the navigable surface is cold enough such as to allow a layer of ice to form on its surface or a layer of snow to collect on its surface. In an embodiment, the outputs of the one or more temperature sensors are used to determine if ice or snow is already present on the navigable surface. In addition, in an embodiment, the outputs of the one or more temperature sensors are used to determine the thermal expansion of any strain/pressure sensors on or mounted to an autonomous vehicle, and, thus, help determine the extent of strain/pressure sensors' output due to thermal expansion. The one or more moisture sensors detect if there is moisture on or near a navigable surface. In an embodiment, the output of the one or more moisture sensors are used to determine if water is present on the navigable surface. In an embodiment, the output of the one or more moisture sensors helps determine if ice or snow is present on the navigable surface. In an embodiment, the output of the one or more humidity sensors is used in ways similar to both the one or more temperature sensors and the one or more moisture sensors.

In some embodiments, anomaly detection system 1300 includes other sensors. These other sensors may include, for example, a rotary position sensor 1930 as shown in FIG. 19 and/or a strain/pressure sensor. In an embodiment, the strain/pressure sensor is in addition to or in place of bristle strain/pressure sensor 1322, and, in an embodiment, makes up or is part of the strain/pressure sensor(s) 1928 as shown in FIG. 19. In an embodiment, the strain/pressure sensor is placed between the tensioning device 1350 and the actuator 1310, effectively forming a force gauge. In other embodiments, the strain/pressure sensor is placed between the tensioning device 1350 and the pivot 1368, effectively forming a force gauge. The strain/pressure sensor detects force, pressure, and/or tension exerted on/by the tensioning device 1350. Because the force, pressure, and/or tension exerted on/by the tensioning device 1350 correlates with the force, pressure, and/or tension exerted on the bristles 1330 and/or brush head 1320, the outputs of the strain/pressure sensor, in an embodiment, are utilized in a similar manner to that of the bristle strain/pressure sensor 1322. That is, the outputs of the strain/pressure sensor are used in determining a friction factor of the navigable surface, which, in turn, is used in determining if there is water, ice, and/or snow on the navigable surface. In an embodiment, the outputs of the strain/pressure sensor are used in determining if there are any cavities in the navigable surface, such as potholes or rumble strips.

As discussed above, in some embodiments, the anomaly detection system 1300 includes a rotary position sensor 1930 as shown in FIG. 19. In an embodiment, the rotary position sensor 1930 is used in addition to or in place of any strain/pressure sensors. At least part of the rotary position sensor 1930 is positioned on pivot 1366 such that when actuator 1310 turns, all or part of the rotary position sensor 1930 turns as well. In some embodiments, the rotary position sensor 1930 is a rotary encoder, such as an optical rotary encoder or a magnetic rotary encoder. In some embodiments, the rotary position sensor 1930 is a Hall Effect rotary sensor. In some embodiments, the rotary position sensor 1930 is a potentiometer. The rotary position sensor 1930 detects the angle and/or the change in angle of the actuator 1310. Because the angle and/or the change in angle of the actuator 1310 correlates to a force, pressure, and/or tension exerted on/by the tensioning device 1350 and because the force, pressure, and/or tension exerted on/by the tensioning device 1350 correlates to a force, pressure, and/or tension exerted on the bristles 1330 and/or brush head 1320, the angle and/or the change in angle of the actuator 1310 correlates to a force, pressure, and/or tension exerted on the bristles 1330 and/or brush head 1320. As such, in an embodiment, the outputs of the rotary position sensor 1930 is utilized in similar manner to that of the bristle strain/pressure sensor 1322. That is, the outputs of the rotary position sensor 1930 is used in determining a friction factor of the navigable surface, which, in turn, is used in determining if there is water, ice, and/or snow on the navigable surface. The outputs of the rotary position sensor 1930 may also be used in determining if there are any cavities in the navigable surface, such as potholes or rumble strips.

In an embodiment, the outputs of the rotary position sensor 1930 are also be used as described herein. Because the force, pressure, and/or tension exerted on/by the tensioning device 1350 also correlates to a force, pressure, and/or tension exerted on the shield 1340, the angle and/or the change in angle of the actuator 1310 correlates to a force, pressure, and/or tension exerted on the shield 1340. As such, in an embodiment, the outputs of the rotary position sensor 1930 are utilized to determine if there is a sizeable obstacle in the road, i.e., one that is large enough to come into contact with the shield 1340. In an embodiment, the bristle strain/pressure sensor 1322 would assist in detecting a drop in friction when the shield 1340 comes into contact with a sizeable obstacle as less of the bristles 1330 would be in contact with the navigable surface. However, a drop in friction could also indicate a number of other road anomalies, such as wet pavement, snow, a pothole, etc. As such, the rotary position sensor 1930 helps differentiate various road anomalies that may produce similar sensor outputs. For example, where there is a drop in detected friction by the bristle strain/pressure sensor 1322 but the angle between the actuator 1310 and the stopper 1362 has grown, then there is a likely indication a sizeable obstacle coming into contact with the shield 1340. There is also an indication of a sizeable obstacle when it is determined that the period of time for which the enlarged angle is detected is relatively small in view of the speed of the vehicle. This is because the time of contact with a sizeable obstacle, and, thus, the period of time for which the enlarged angle is detected, will be relatively short, only lasting until the obstacle passes under or around the anomaly detection system 1300. A relatively large period of time for which an enlarged angle is detected may indicate that the vehicle is traveling in off-road type conditions where multiple objects or raised portions of the navigable surface are frequently coming into contact with the shield 1340 of the anomaly detection system 1300. Additionally, in an embodiment, the outputs of the rotary position sensor 1930 are utilized to determine the mass of the sizeable object by taking into account, at least, the speed of the autonomous vehicle and the force applied by the tensioning device 1350 at the detected angle.

In this embodiment, mount 1360 houses a sensor unit 1370. In an embodiment, the sensor unit includes, for example, a GPS 1922 as shown in FIG. 19, an accelerometer 1924 as shown in FIG. 19, and a gyroscope 1926 as shown in FIG. 19. In an embodiment, GPS 1922 is one of the sensors 121 as shown in FIG. 1 and FIG. 4. In an embodiment, accelerometer 1924 is one of the sensors 121 as shown in FIG. 1 and FIG. 4. In an embodiment, gyroscope 1926 is one of the sensors 121 as shown in FIG. 1 and FIG. 4. In an embodiment, accelerometer 1924 and gyroscope 1926 form an inertial measurement unit (IMU) that measures both vehicle linear accelerations and angular rates. GPS 1922 detects a location of an autonomous vehicle. In an embodiment, an output of the GPS 1922 is used in determining the location of an autonomous vehicle when it came into contact with an anomaly of a navigable surface, such as a pothole. In an embodiment, the sensor unit 1370 includes other microelectromechanical systems (MEMS) such as MEMS accelerometers, MEMS IMUs, MEMS gyroscopes, etc. In an embodiment, the sensor unit 1370 includes nanoelectromechanical systems.

In an embodiment, accelerometer 1924 detects an acceleration of an autonomous vehicle. Gyroscope 1926 detects an orientation of the vehicle and, in some examples, helps to determine an angular rate of a vehicle. In an embodiment, the outputs of gyroscope 1926 are used in determining gravitational force vectors acting on the anomaly detection system 1300, which, in turn, are used in determining the extent of force exerted on the bristles 1330, brush head 1320, and/or tensioning device 1350 by gravity. This information is helpful in calculating a friction factor by determining the extent of force acting on the bristles 1330 and/or brush head 1320 due to friction. In an embodiment, the outputs of accelerometer 1924 are used in determining force vectors acting on the anomaly detection system 1300 due to an autonomous vehicle's acceleration, which, in turn, are used in determining the extent of force exerted on the bristles 1330, brush head 1320, and/or tensioning device 1350 by the autonomous vehicle's acceleration. This information is helpful in calculating a friction factor by determining the extent of force acting on the bristles 1330 and/or brush head 1320 due to friction. As such, the outputs of gyroscope 1926 and accelerometer 1924 are used together to isolate the force acting on bristles 1330 and/or brush head 1320 due to friction. The outputs of an IMU are used in ways similar to that of both gyroscope 1926 and accelerometer 1924.

Figure 14:
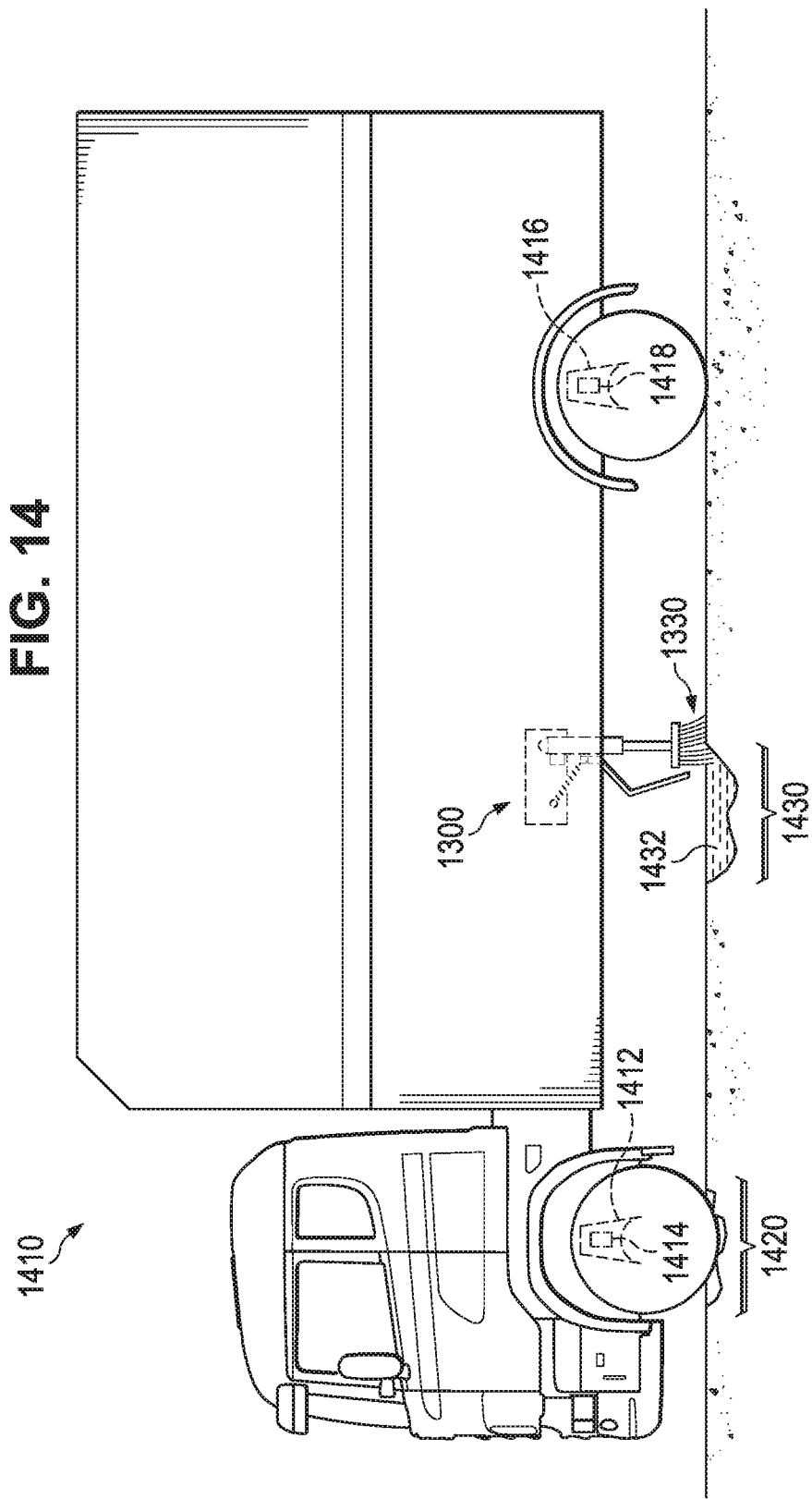
FIG. 14 shows an example of an anomaly detection system coupled to an autonomous vehicle.

FIG. 14 illustrates an autonomous vehicle 1410 with the anomaly detection system 1300 positioned on the autonomous vehicle's 1410 undercarriage, between the front suspension 1412 and rear suspension 1416. In addition to the anomaly detection system 1300, in an embodiment, the autonomous vehicle 1410 also contains additional detection devices, such as strain/pressure sensors 1414 and strain/pressure sensors 1418.

In this embodiment, strain/pressure sensors 1414 and strain/pressure sensors 1418 are mounted to the autonomous vehicle's 1410 front suspension 1412 and rear suspension 1416, respectively. In another embodiment, additional strain/pressure sensors are mounted to the autonomous vehicle's 1410 tires. In another embodiment, strain/pressure sensors 1414 and strain/pressure sensors 1418 are mounted to the autonomous vehicle's 1410 tires. In an embodiment, strain/pressure sensors 1414 and strain/pressure sensors 1418 are strain gauges. In an embodiment, strain/pressure sensors 1414 and strain/pressure sensors 1418 are piezoresistors.

Strain/pressure sensors 1414 and strain/pressure sensors 1418 detect the pressure, force, and/or tension that is exerted on the autonomous vehicle's 1410 front suspension 1412 and rear suspension 1416, respectively. The outputs of strain/pressure sensors 1414 and strain/pressure sensors 1418 are used in determining whether there are any cavities in the navigable surface, such as potholes or rumble strips. For example, when vehicle 1410 comes into contact with pothole 1420 in a road, an additional strain is placed on the autonomous vehicle's 1410 front suspension 1412. The strain/pressure sensors 1414 will detect the additional strain. In an embodiment, an analysis of the outputs of strain/pressure sensors 1414 determine that the anomaly was in fact a pothole by comparing the outputs with previous measurements or predetermined estimated outputs. In an embodiment, an analysis of the outputs of strain/pressure sensors 1414 determines that the anomaly was in fact a small pothole by comparing the outputs with previous measurements or predetermined estimated outputs. In an embodiment, an analysis of the outputs of strain/pressure sensors 1414 determine that the anomaly was in fact a pothole and not, for example, a rumble strip by comparing the outputs with previous measurements or predetermined estimated outputs.

As shown in FIG. 14, in an embodiment, anomaly detection system 1300 is placed on the undercarriage of the autonomous vehicle 1410, between the front suspension 1412 and rear suspension 1416. In this embodiment, the anomaly detection system 1300 has just encountered a large pothole 1430 containing a puddle of water 1432. Bristles 1330 are partially in contact with a road and partially in contact with water from the puddle 1432. As the bristles 1330 start to fall into the pothole 1430, the force on the bristles 1330 and/or brush head 1320 due to friction lessens. This, in turn, lessens the force on the tensioning device 1350 and, if the position of the actuator 1310 was such that it was not in contact with the stopper 1362 prior to bristles 1330 encountering the pothole 1430, then the angle between the actuator 1310 and stopper 1362 is lessened. As such, the output of the bristle strain/pressure sensor would indicate a lowering of pressure, force, and/or tension on the bristles 1330 and/or brush head 1320. The output of a strain/pressure sensor coupled to the tensioning device 1350 would indicate a lowering force, pressure, and/or tension exerted on/by the tensioning device 1350. If the position of the actuator 1310 was such that it was not in contact with the stopper 1362 prior to bristles 1330 encountering the pothole, then the output of any rotary position sensor(s) 1930 as shown in FIG. 19 coupled to the pivot 1366 would indicate a lessening of the angle between actuator 1310 and the stopper 1362. Any of moisture or humidity sensors of bristle sensors 1332 would detect that the presence of moisture on the navigable surface as the bristles 1330 make contact with the puddle 1432. However, in an embodiment, an analysis of the outputs of the one or more moisture and/or humidity sensors would show that moisture was only detected for a short period of time on the navigable surface (since the bristles would soon be lifted out of the puddle as the autonomous vehicle 1410 moves down the road, passing the pothole 1430 and puddle 1432) and that autonomous vehicle 1410 and/or other autonomous vehicles would, for example, ignore the moisture detection while taking note of the pothole.

As vehicle 1410 continues to move down the navigable surface, the bristles 1330 would fully enter the pothole 1430 where friction force on the bristles 1330 and/or brush head 1320 would be lowest. Later, the bristles 1330 would reencounter the navigable surface at a second edge of the pothole 1430. At this point, the force on the bristles 1330 and/or brush head 1320 due to friction increases. This, in turn, increases the force on the tensioning device 1350 and, if this force increase is sufficient to lengthen tensioning device 1350, then the angle between the actuator 1310 and stopper 1362 is increased. As such, the output of the bristle strain/pressure sensor would indicate an increasing of pressure, force, and/or tension on the bristles 1330 and/or brush head 1320. The output of a strain/pressure sensor coupled to the tensioning device 1350 would indicate an increasing force, pressure, and/or tension exerted on/by the tensioning device 1350. If this force increase is sufficient to lengthen tensioning device 1350, then the output of any rotary position sensor(s) 1930 as shown in FIG. 19 coupled to the pivot 1366 would indicate an increasing of the angle between actuator 1310 and the stopper 1362. Any of moisture or humidity sensors of bristle sensors 1332 would stop detecting that the presence of moisture on the navigable surface as the bristles 1330 are pulled out of the puddle 1432.

Figure 15:
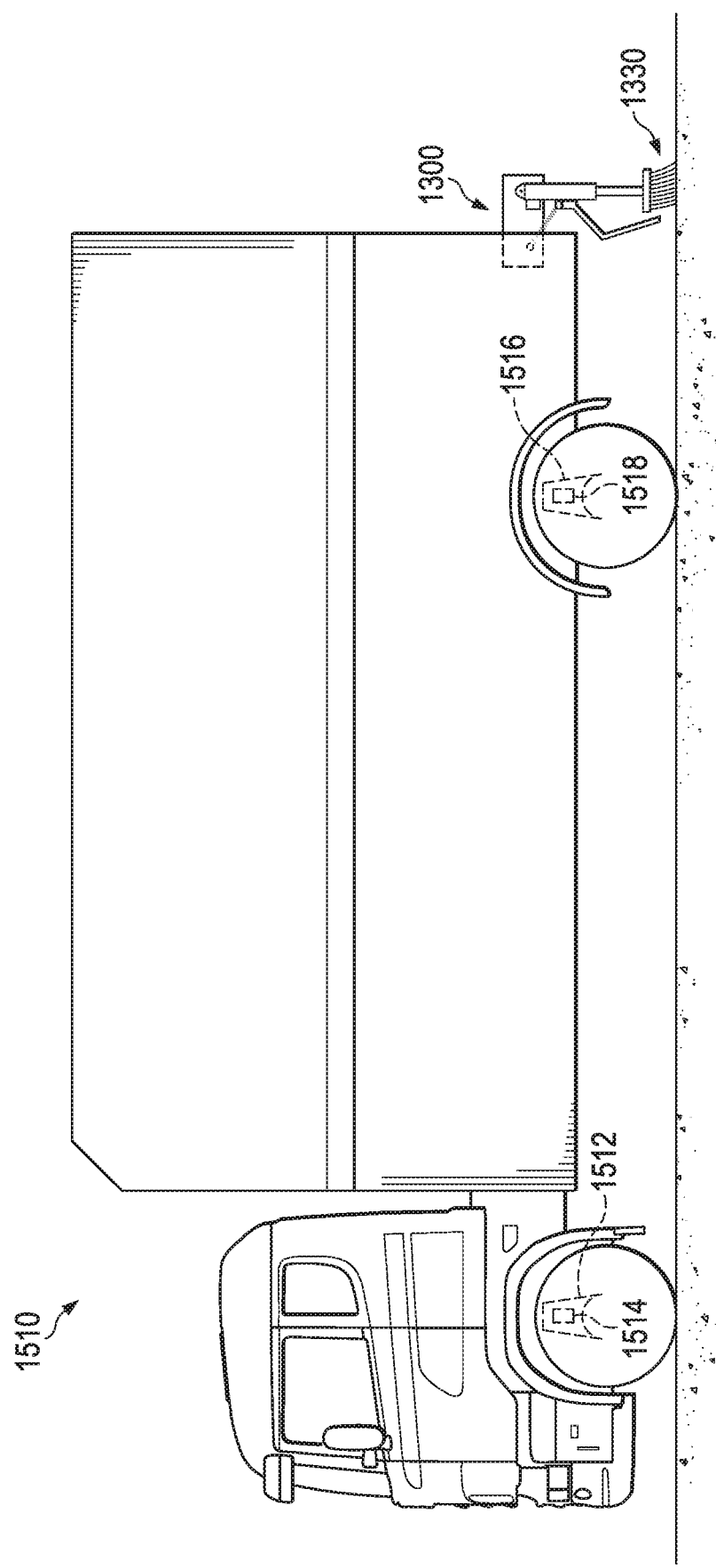
FIG. 15 shows an example of an anomaly detection system coupled to an autonomous vehicle.

FIG. 15 illustrates an autonomous vehicle 1510 with the anomaly detection system 1300 positioned on at/off the rear of autonomous vehicle 1510, behind both the front suspension 1512 and rear suspension 1516. In addition to the anomaly detection system 1300, in an embodiment, the autonomous vehicle 1510 also includes additional detection devices, such as strain/pressure sensors 1514 and strain/pressure sensors 1518.

In an embodiment, the anomaly detection system 1300 is placed at/off the rear of autonomous vehicle 1510, as an alternative to positioning the anomaly detection system 1300 as seen in FIG. 14. In this embodiment, the anomaly detection system 1300 mounted at the rear of a vehicle, requires less modification to the vehicle as compared with mounting the anomaly detection system in a position as seen in FIG. 14. Mounting the anomaly detection system at the rear of the vehicle allows the anomaly system to be widened to the full width of the vehicle or past the full width of the vehicle; thus, allowing the system to detect more of the navigable surface with fewer passes and/or fewer vehicles. In this embodiment, the anomaly detection system 1300 that is wider than the autonomous vehicle to which it is coupled, provides a clearer picture of each lane of a road, for example, since road lanes are wider than vehicles, sometimes significantly so.

Figure 16A:
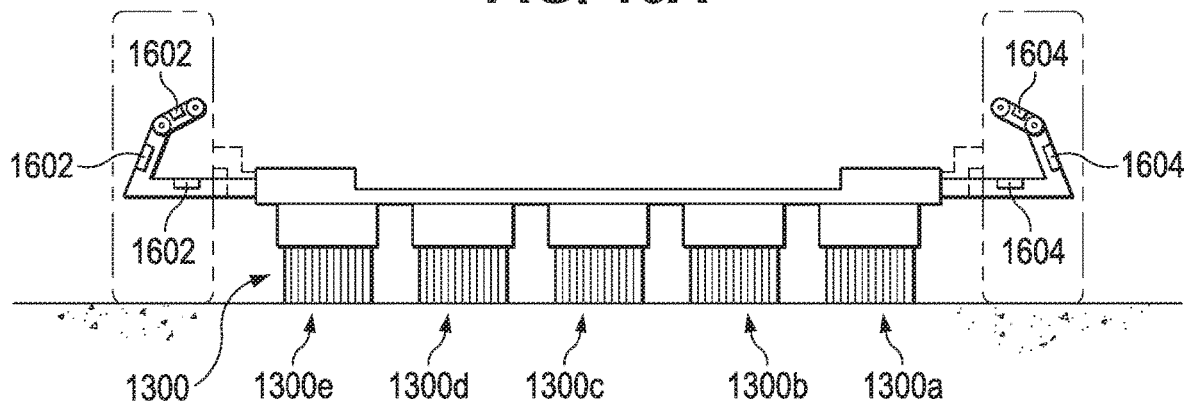
FIG. 16A shows an example of a front view of an anomaly detection system coupled to an autonomous vehicle.

FIG. 16A illustrates a front view of anomaly detection system 1300 positioned on an autonomous vehicle's undercarriage. In this embodiment, anomaly detection system 1300 has a number of subparts 1300*a-e*, along the width of the vehicle. In this embodiment, from the front view, only the shields of subparts 1300*a-e* and the bristles of each subpart are visible.

In this embodiment, subparts 1300*a-e* each have their own actuator, brush head, set of bristles, tensioning device, and stopper. In an embodiment, subparts 1300*a-e* each have their own mount where one of the mounts houses a sensor unit. In an embodiment, subparts 1300*a-e* share a mount. In an embodiment, subparts 1300*a-e* share one shield that spans from subpart 1300*a* to subpart 1300*e*. In an embodiment, subparts 1300*a-e* share a single brush head and set of bristles that span from subpart 1300*a* to subpart 1300*b*. Although five subparts are shown, a higher or lesser number of subparts is possible in other embodiments. In some embodiments, anomaly detection system 1300 does not have any subparts.

As shown in FIG. 16A, in this embodiment, a number of sensors, such as strain/pressure sensors 1602 and strain/pressure sensors 1604, are coupled at various locations on the front suspension near the tires. In an embodiment, the strain/pressure sensors 1602 and strain/pressure sensors 1604 are strain gauges. In an embodiment, the strain/pressure sensors 1602 and strain/pressure sensors 1604 are piezoresitors. In one embodiment, the strain/pressure sensors 1602 and strain/pressure sensors 1604 are strain/pressure sensors 1414 as shown in FIG. 14. In another embodiment, the strain/pressure sensors 1602 and strain/pressure sensors 1604 are strain/pressure sensors 1514 as shown in FIG. 15. Having strain/pressure sensors 1602 and strain/pressure sensors 1604 detecting strain on the autonomous vehicle's suspension and/or tires provide, at least in this embodiment, a wider field of anomaly detection. For example, if only the front right tire of the autonomous vehicle comes into contact with a pothole, i.e., no part of the anomaly detection system 1300 comes into contact with it, then the outputs of strain/pressures sensors 1602 indicate a presence of a pothole that would have otherwise not been detected.

Figure 16B:
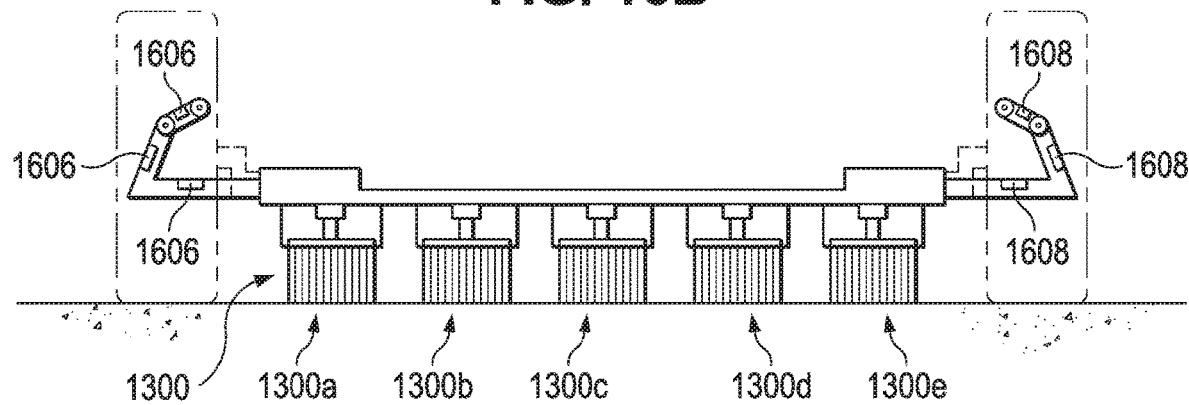
FIG. 16B shows an example of a back view of an anomaly detection system coupled to an autonomous vehicle.

FIG. 16B illustrates a back view of anomaly detection system 1300 positioned on an autonomous vehicle's undercarriage. In this embodiment, anomaly detection system 1300 has a number of subparts 1300*-e* along the width of the vehicle. In this embodiment, from the back view, the shields, actuators, brush heads, and the bristles of each subpart are visible.

In this embodiment, subparts 1300*a-e* each have their own actuator, brush head, set of bristles, tensioning device, and stopper. In an embodiment, subparts 1300*a-e* each have their own mount where one of the mounts house a sensor unit. In an embodiment, subparts 1300*a-e* share a mount. In an embodiment, subparts 1300*a-e* share one shield that spans from subpart 1300*a* to subpart 1300*e*. In an embodiment, subparts 1300*a-e* share a single brush head and set of bristles that span from subpart 1300*a* to subpart 1300*e*. Although five subparts are shown, a higher or lesser number of subparts is possible in other embodiments. In some embodiments, anomaly detection system 1300 does not have any subparts.

In an embodiment, as shown in FIG. 16B, a number of sensors, such as strain/pressure sensors 1606 and strain/pressure sensors 1608, are be coupled at various locations on the rear suspension near the tires. In an embodiment, the strain/pressure sensors 1606 and strain/pressure sensors 1608 are strain gauges. In an embodiment, the strain/pressure sensors 1606 and strain/pressure sensors 1608 are piezoresitors. In one embodiment, the strain/pressure sensors 1606 and strain/pressure sensors 1608 are strain/pressure sensors 1418 as shown in FIG. 14. In another embodiment, the strain/pressure sensors 1606 and strain/pressure sensors 1608 are strain/pressure sensors 1518 as shown in FIG. 15. Having strain/pressure sensors 1606 and strain/pressure sensors 1608 detecting strain on the autonomous vehicle's suspension and/or tires provides, at least in this example, a wider field of anomaly detection. For example, if only the front right tire of the autonomous vehicle comes into contact with a pothole, i.e., no part of the anomaly detection system 1300 comes into contact with it, then the outputs of strain/pressures sensors 1608 indicate a presence of a pothole that would have otherwise not been detected.

Controlling the Operation of One or More Autonomous Vehicles Based on Detected Anomalies In some embodiments, a computer system controls the operation of one or more autonomous vehicles. For example, a computer system deploys autonomous vehicles to one or more locations or regions, assigns transportation tasks to each of the autonomous vehicles (e.g., pick up and transport passengers, pick up and transport cargo, etc.), assigns maintenance tasks to each of the autonomous vehicles (e.g., charge their batteries at charging stations, receive repairs at a service station, etc.), and/or assigns other tasks to each of the autonomous vehicles.

Figure 17:
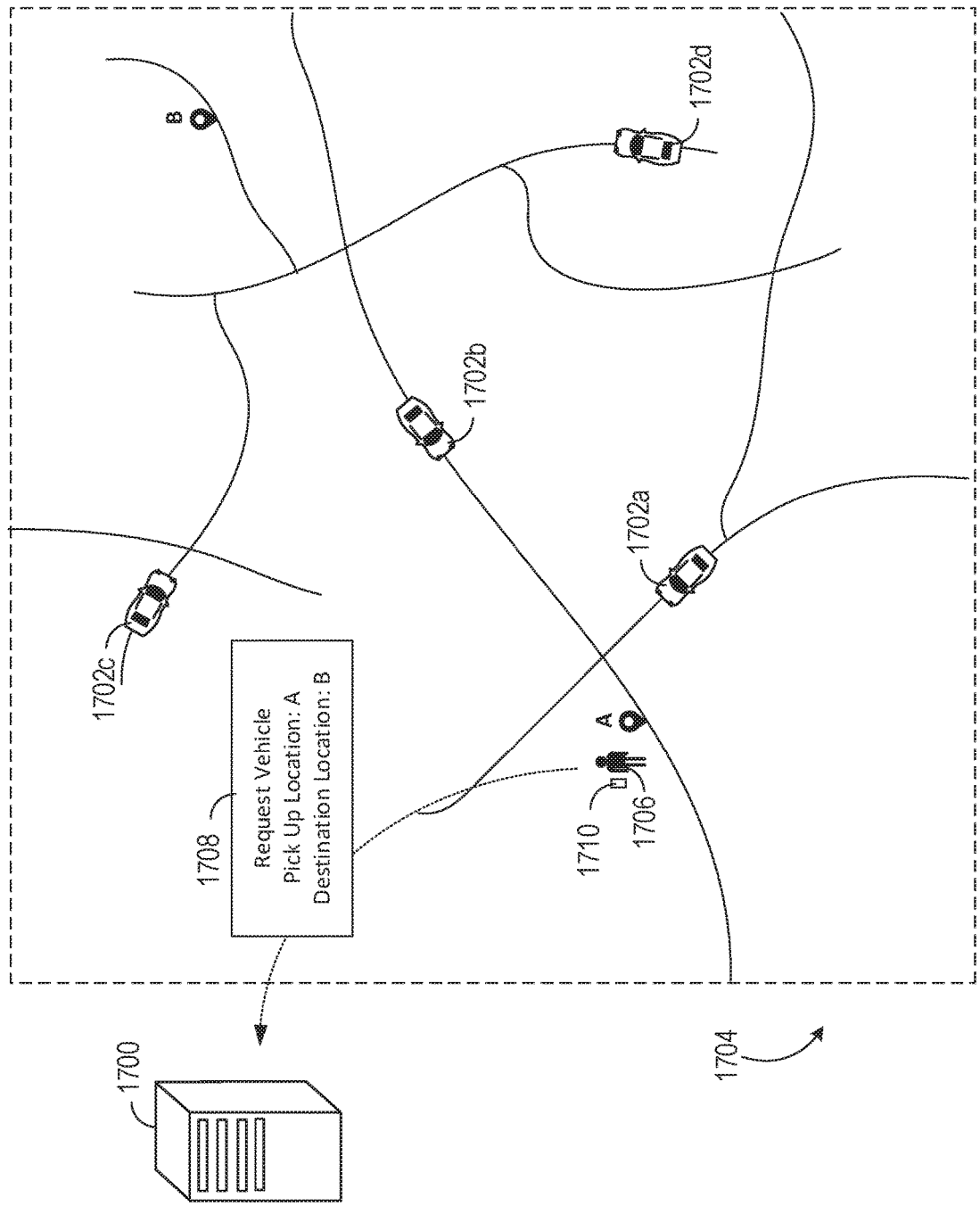
FIG. 17 shows an example usage of a computer system to control the operation of a fleet of autonomous vehicles.

FIG. 17 shows a computer system 1700 for controlling the operation of a fleet of autonomous vehicles 1702*a-d*. In this embodiment, the computer system 1700 is remote from each of the autonomous vehicles 1702*a-d*, and communicates with the autonomous vehicles 1702*a-d* (e.g., via a wireless communications network). In some embodiments, the computer system 1700 is implemented in a similar manner as the remote servers 136 described with respect to FIG. 1 and/or the cloud computing environment 300 described with respect to FIGS. 1 and 3. In some embodiments, one or more of the autonomous vehicles 1702*a-d* are implemented in a similar manner as the autonomous vehicle 100 described with respect to FIG. 1A.

Each of the autonomous vehicles 1702*a-d* is positioned in a geographical region 1704. The geographical region 1704 corresponds to a particular political region (e.g., a particular country, state, county, province, city, town, borough, or other political region), a particular pre-defined region (e.g., a region having particular pre-defined boundaries such as a software determined geo-fenced area), a transiently-defined region (e.g., a region having dynamic boundaries such as a group of streets affected by dense traffic), or any other region.

In this embodiment, a user 1706 positioned at a location "A" wishes to travel to a location "B" in an autonomous vehicle. To request an autonomous vehicle for use, the user 1706 transmits a request 1708 to the computer system 1700 (e.g., via a mobile device 1710, such as a smartphone, tablet computer, or wearable computing device). In some embodiments, the request 1708 includes one or more data items indicating the user's desired pick up location (e.g., the current location of the user or another pick up location specified by the user), a desired pick up time, and/or a desired destination location (e.g., a destination location specified by the user).

Responsive to the request 1708, the computer system 1700 selects one of the autonomous vehicles 1702*a-d* to fulfill the request. The computer system 1700 considers one or more different criteria in selecting an autonomous vehicle. For example, the computer system 1700 determines which of the autonomous vehicles is currently available (e.g., is not currently assigned to transport a passenger and/or cargo, and/or is not actively transporting a passenger and/or or cargo) and selects one of the available autonomous vehicles for assignment to the user 1706. As another example, the computer system 1700 also considers whether an autonomous vehicle is currently unavailable, but is anticipated to be available in the future (e.g., an autonomous vehicle that is currently assigned to another task, but is anticipated to complete its task in an amount of time sufficient for subsequent assignment to the user 1706 and arrival at the user's desired pick up location at the desired time). In some embodiments, the computer system 1700 prioritizes certain autonomous vehicles for selection over others (e.g., based on the proximity of the autonomous vehicles with respect to the user 1706, the orientation or heading of the autonomous vehicles with respect to the user 1706, time and/or ease in which the autonomous vehicles can reach the user 1706, the ability for autonomous vehicles to navigate to users while minimally affecting traffic flows, the ability for autonomous vehicles to navigate to users while considering detected anomalies of the navigable surfaces).

The path of the autonomous vehicles 1702*a-d* is determined by the autonomous vehicles 1702*a-d* themselves and/or by the computer system 1700. In some embodiments, such a determination is be made by the mapping module 1960 as shown in FIG. 19. For instance, in an embodiment, the autonomous vehicles 1702*a-d* determine a path of travel based on its current location, the detected anomalies, and its goal location (e.g., the specified pick up location and/or the specified destination location). In an embodiment, the computer system 1700 determines a path of travel for the autonomous vehicles 1702*a-d* and transmits the determined path to the autonomous vehicles 1702*a-d* (e.g., in a command signal, or some other data transmission). In an embodiment, the anomaly detection module 1962 as shown in FIG. 19 determines a desired driving capability that the autonomous vehicle change routes. In doing so, the mapping module 1960 as shown in FIG. 19 receives such desired driving capability from the anomaly detection module 1962 and then updates a map of the autonomous vehicle to reflect a newly chosen route.

The operation of the computer system 1700 can provide various technical benefits. As an example, in an embodiment, the computer system 1700 facilitates the automatic operation of a fleet of autonomous vehicles, enabling autonomous vehicles to fulfill requests in an automated manner without human intervention. Further, in an embodiment, the computer system automatically controls the operation of the fleet of autonomous vehicles such that requests are fulfilled in an efficient and effective manner (e.g., by reducing the amount of time that autonomous vehicles are idle, increasing the speed at which requests are fulfilled, decreasing the wear and tear on vehicles by having them avoid roads with a large number of detected anomalies, increasing the safety of passengers by avoiding detected anomalies and choosing routes which are less likely to encounter an anomaly, and increasing the safety of the passengers by adjusting a driving function of an autonomous vehicle in reaction to a detected anomaly).

Figure 18:
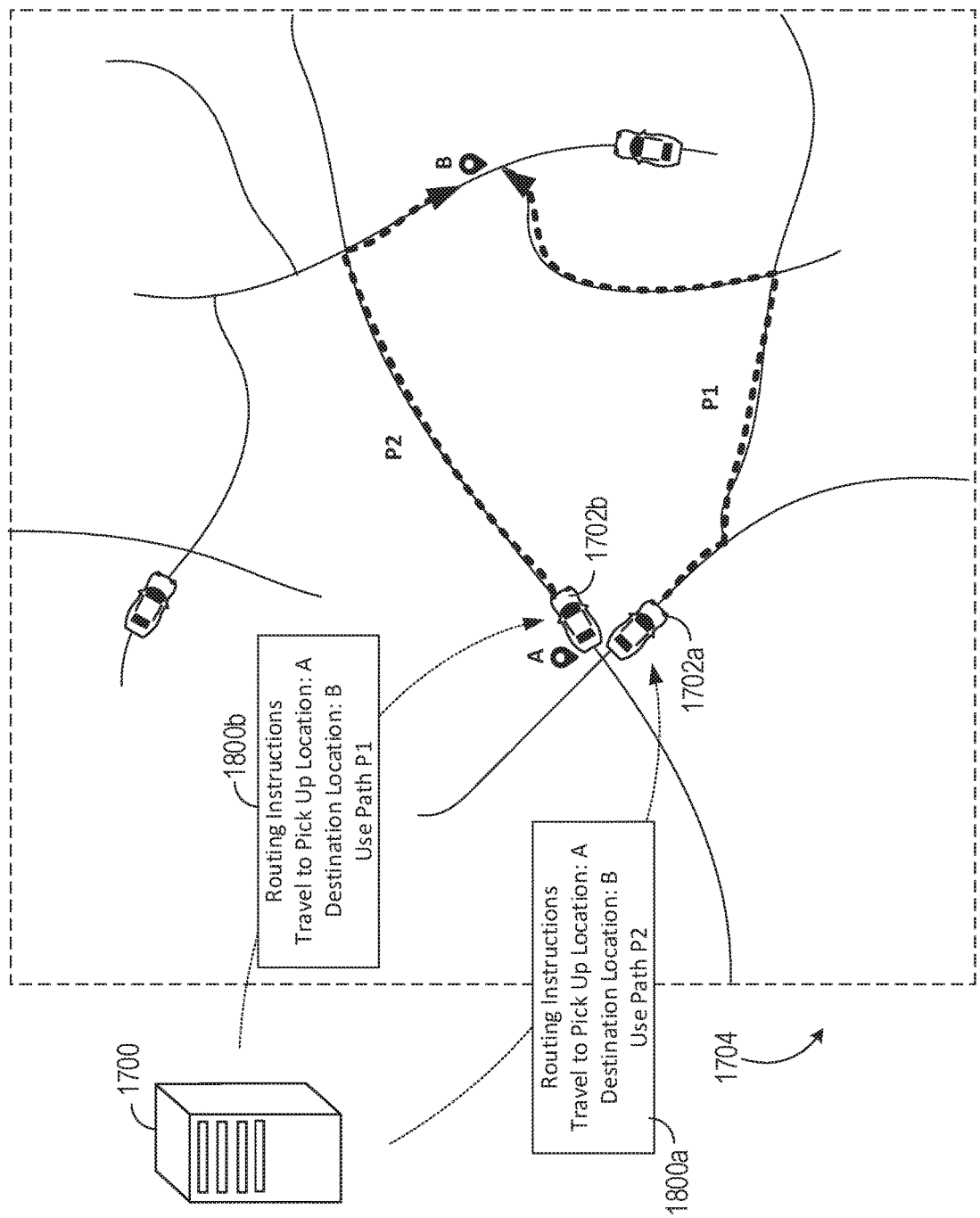
FIG. 18 shows an example usage of a computer system to route autonomous vehicles also different paths.

As an example, as shown in FIG. 18, two autonomous vehicles 1702*a* and 1702*b* are positioned at a similar location (e.g., in proximity to a pick up location A) and have been assigned to travel to a similar destination location (e.g., to a specified location B). To mitigate road congestion, the computer system 1700 transmits a first command signal 1800*a* to a first autonomous vehicle 1702*a* including instructions to navigate to the destination location along a path P1, and a second command signal 1800*b* to a second autonomous vehicle 1702*b* including instructions to navigate to the destination location along a path P2. Paths P1 and P2 are different from one another, and utilize at least some different roads from one another. Accordingly, the impact on traffic flows and route conditions of the autonomous vehicles is spread among different routes, rather than concentrated on a single route. Similarly, in an embodiment, based on the type and/or number of detected anomalies along path P1, the mapping module 1960 and/or anomaly detection module 1962 as shown in FIG. 19 determines that path P2 is a safer route than path P1. For example, ice was detected on a large section of path P1 but was not detected on path P2. Based on the detected anomalies, autonomous vehicle 1702*b* will be permitted to continue down path P2. Based on the detected anomalies, autonomous vehicle 1702*a* will be directed to turn around and take path P2 instead of P1.

In some embodiments, a computer system 1700 estimates a future demand for use of autonomous vehicles, and preemptively direct autonomous vehicles to certain locations to better meet the estimated demand. For instance, in an embodiment, the computer system 1700 directs autonomous vehicles to certain locations, even if it has not yet received a request from a user associated with that location. In some embodiments, the computer system 1700 estimates a relatively higher future demand for autonomous vehicles at a particular location, and direct autonomous vehicles to that location from locations having a relatively lower current and/or estimated future demand. Similarly, in some embodiments the computer system 1700 estimates a future condition of a navigable surface, and preemptively adjusts a driving function of the autonomous vehicles. For instance, based on a historical data of ice being much more present on the roadway during this time of the year, the computer system 1700 has the autonomous vehicles slow down to five miles per hour under the speed limit.

FIG. 19 is a simplified block diagram of the anomaly detection system 1300. As shown in this embodiment, the anomaly detection system 1300 includes a brush system 1910, a sensor system 1920, a communication system 1940, a computation system 1950, a mapping module 1960, and an anomaly detection module 1962. In other embodiments, the anomaly detection system 1300 includes more, fewer, or different systems, and in some embodiments each system include more, fewer, or different components.

The brush system 1910 is configured to be combined with one or more sensors and to allow those sensors to detect information about a navigable surface. In an embodiment, the brush system 1910 is mounted on the undercarriage of one or more autonomous vehicles. As shown, the brush system 1910 includes one or more shields 1340, one or more tensioning devices 1350, one or more actuators 1310, one or more mounts 1360, one or more brush heads 1320, and bristles 1330. In other embodiments, the brush system 1910 may include more, fewer, or different components.

The one or more shields 1340 are each configured to protect a respective one or more actuators 1310 from coming into contact with debris or other objects that may be present on a navigable surface and to guide debris underneath the one or more brush heads 1320 and bristles 1330. Each of the one or more shields 1340 are coupled to a respective actuator of the one or more actuators 1310. In an embodiment, the one or more shields 1340 are also configured to protect the one or more brush heads 1320 from coming into contact with debris or other objects that may be present on a navigable surface. In an embodiment, the one or more shields 1340 are each formed from a solid piece of material. In an embodiment, the one or more shields 1340 are made of plastic. In an embodiment, the one or more shields 1340 are made of metal.

The one or more tensioning devices 1350 are configured to provide tension on the one or more actuators 1310 in a direction generally towards the one or more stoppers 1362. In an embodiment, the one or more tensioning devices are coupled to the one or more actuators 1310 and to the one or more mounts 1360. In an embodiment, the one or more tensioning devices 1350 are springs. In an embodiment, the one or more tensioning devices 1350 are bands made from an elastomer, including but not limited to, natural or synthetic rubber. In an embodiment, the one or more tensioning devices 1350 are tubes made from an elastomer, including but not limited to, natural or synthetic rubber. In an embodiment, one or more strain/pressure sensors of the one or more strain/pressure sensors 1928 are mounted between the one or more tensioning devices 1350 and the one or more actuators 1310. In an embodiment, one or more strain/pressure sensors of the one or more strain/pressure sensors 1928 are mounted between the one or more tensioning devices 1350 and the one or more mounts 1360.

Each of the one or more actuators 1310 are configured to lower and raise a respective brush head of the one or more brush heads 1320 and to bring the bristles 1330 into contact with a navigable surface. The one or more actuators 1310 are connected to the one or more brush heads 1320. The one or more actuators 1310 are coupled to the one or more mounts 1360 through one or more pivots 1366. In an embodiment, the one or more actuators 1310 are hydraulic cylinders. In an embodiment, the one or more actuators 1310 are pneumatic actuators. In an embodiment, the one or more actuators 1310 are electro-mechanical actuators. In an embodiment, the one or more rotary position sensors 1930 are mounted on the one or more pivots where the one or more actuators 1310 are coupled to the one or more mounts 1360.

The one or more mounts 1360 are configured to connect the brush system 1910 to an autonomous vehicle. The one or more mounts 1360 include one or more stoppers 1362 that are configured to prevent the one or more actuators 1310 from moving in a clockwise direction once the one or more actuators 1310 come into contact with the one or more stoppers 1362. The one or more mounts 1360 are coupled to one or more actuators 1310 through a pivot 1366. In an embodiment, the one or more mounts 1360 are coupled to the one or more tensioning devices 1350, through a pivot 1368. In an embodiment, one of the one or more mounts 1360 house the sensor unit 1370.

The one or more brush heads 1320 are configured to hold the bristles 1330 and one or more strain/pressure sensors of the one or more strain/pressure sensors 1928. The one or more brush heads 1320 are connected to the lower end of the one or more actuators 1310. The one or more strain/pressure sensors of the one or more strain/pressure sensors 1928 are held between the one or more brush heads 1320 and the bristles 1330. In an embodiment, the one or more brush heads 1320 holds the bristles 1330 through adhesive. In an embodiment, the one or more brush heads 1320 holds the bristles 1330 through a mechanical connection.

The bristles 1330 are configured to make contact with the navigable surface, to hold or house one or more temperature sensors 1934, and to hold or house one or more moisture sensors 1932. One end of each bristle of bristles 1330 are connected to the one or more brush heads 1320. In an embodiment, each bristle of bristles 1330 ends in a temperature sensor and/or a moisture sensor. In an embodiment, less than all the bristles of bristles 1330 end in a temperature sensor and/or a moisture sensor. In an embodiment, at least some of the bristles 1330 are formed from synthetic material. In an embodiment, the one or more bristles of bristles 1330 that end in one or more temperature and/or moisture sensors are hollow so as to allow one or more wires to run through the bristle and connect to the one or more sensors. In an embodiment, the one or more bristles of bristles 1330 that end in one or more temperature and/or moisture sensors are formed from an insulated wire.

The sensor system 1920 includes a number of sensors configured to sense information about a navigable surface on which an autonomous vehicle travels. As shown, the sensor system 1920 includes sensor unit 1370, one or more strain/pressure sensors 1928, one or more rotary position sensors 1930, one or more moisture sensors 1932, and one or more temperature sensors 1934. In other embodiments, the sensor system 1920 includes more, fewer, or different components.

The sensor unit 1370 includes a number of sensors configured to determine a location of an autonomous vehicle, determine a linear acceleration of an autonomous vehicle, and determine an angle of an autonomous vehicle. The sensor unit 1370 includes a global positioning system (GPS) 1922, an accelerometer 1924, and a gyroscope. In an embodiment, the sensor unit also includes one or more sensors configured to determine an angular rate of an autonomous vehicle. In an embodiment, the sensor unit 1370 is housed in one of the one or more mounts 1360 of the brush system 1910.

The GPS 1922 is configured to detect an estimated location of an autonomous vehicle with respect to the earth. In an embodiment, the GPS 1922 is configured to detect a speed of an autonomous vehicle. In an embodiment, the GPS 1922 is configured to detect a direction of travel of an autonomous vehicle. In an embodiment, the GPS 1922 is configured to detect time information of an autonomous vehicle. In an embodiment, the GPS 1922 is one of the sensors 121 as shown in FIG. 1 and FIG. 4.

The accelerometer 1924 and gyroscope 1926 are configured to determine a linear acceleration of an autonomous vehicle and an angle of an autonomous vehicle. In an embodiment, the accelerometer 1924 and gyroscope 1926 are configured to determine an angular rate of an autonomous vehicle. In an embodiment, the accelerometer 1924 and gyroscope 1926 are also configured to determine a change in orientation of an autonomous vehicle. In an embodiment, the accelerometer 1924 and gyroscope 1926 form an inertial measurement unit (IMU). In an embodiment, the gyroscope 1926 and/or the accelerometer 1924 are one of the sensors 121 as shown in FIG. 1 and FIG. 4.

The one or more strain/pressure sensors 1928 are configured to detect a pressure, force, and/or tension that is exerted on part of the anomaly detection system 1300 and/or an autonomous vehicle. The one or more strain/pressure sensors 1928 are positioned such as to sense a pressure, force, and/or tension due to the autonomous vehicle and/or part of the anomaly detection system 1300 coming into contact with a navigable surface. In an embodiment, one or more of the one or more strain/pressure sensors 1928 are strain gauges. In an embodiment, one or more of the one or more strain/pressure sensors 1928 are piezoresitors. In an embodiment, one of the one or more strain/pressure sensors 1928 is placed between the brush head 1320 and bristles 1330. Such is shown in the embodiment shown in FIG. 13 with bristle strain/pressure sensor 1322. In an embodiment, the one or more strain/pressure sensors 1928 includes strain/pressure sensors coupled to the suspension of an autonomous vehicle. Such is shown in FIG. 14 with strain/pressure sensors 1414 and 1418. Such is also shown in FIG. 15 with strain/pressure sensors 1514 and 1518. Such is also shown in FIG. 16A with strain/pressure sensors 1602 and 1604. Such is also shown in FIG. 16B with strain/pressure sensors 1606 and 1608.

The one or more rotary position sensors 1930 are configured to detect an angle and/or change in angle of the one or more actuators 1310 with respect to the one or more stoppers 1362. At least part of the one or more rotary position sensors 1930 are positioned on the one or more pivots where the one or more actuators 1310 are coupled to the one or more mounts 1360. In an embodiment, one or more of the one or more rotary position sensors 1930 are rotary encoders, such as optical rotary encoders or magnetic rotary encoders. In an embodiment, one or more of the one or more rotary position sensors 1930 are Hall Effect rotary sensors. In an embodiment, one or more of the one or more rotary position sensors 1930 are potentiometers.

The one or more moisture sensors 1932 are configured to detect if there is moisture on or near a navigable surface. The one or more temperature sensors 1934 are configured to detect a temperature of a navigable surface, a temperature near a navigable surface, changes in temperature of a navigable surface, and/or changes in temperature near a navigable surface. In an embodiment, the one or more moisture sensors 1932 and the one or more temperature sensors 1934 are combined in the form of a humidity sensors. In an embodiment, the one or more moisture sensors 1932 make up at least part of bristle sensors 1332 as shown in FIG. 13. In an embodiment, the one or more temperature sensors 1934 make up at least part of bristle sensors 1332 as shown in FIG. 13.

The communication system 1940 is configured to wirelessly couple the anomaly detection system 1300 to one or more other autonomous vehicles, one or more sensors outside of the anomaly detection system 1300, and/or a centralized computer system. Where the communication system 1940 is configured to wirelessly couple the anomaly detection system 1300 to one or more other autonomous vehicles and/or one or more sensors outside of the anomaly detection system 1300, such communication may take place through Vehicle-to-Vehicle (V2V), Vehicle-to-Infrastructure (V2I), point-to-point networks, and/or ad hoc networks. In an embodiment, communication occurs across the electromagnetic spectrum (including radio and optical communications) or other media (e.g., air and acoustic media). Where the communication system 1940 is configured to wirelessly couple the anomaly detection system 1300 to a centralized computer system, the communication may take place over a network. Information exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet. In an embodiment, the centralized computer system is embedded in a cloud computing environment, such as clouds computing environment 200 as described in FIG. 2. In an embodiment, the communication system 1940 includes communication interfaces. For example, wireless, WiMAX, Wi-Fi, Bluetooth, satellite, cellular, optical, near field, infrared, or radio interfaces. As shown, communication system 1940 includes a receiver 1942 and a transmitter 1944. In other embodiments, the communication system 1940 includes more, fewer, or different components.

The receiver 1942 is configured to receive information from one or more other autonomous vehicles, one or more sensors outside of the anomaly detection system 1300 (e.g., wheel speed sensors for measuring or estimating wheel slip ratios), and/or a centralized computer system and provide such information to computation system 1950. In an embodiment, the receiver 1942 is a laser or radio frequency wave receiver. In an embodiment, the receiver 1942 receives measured or inferred properties of other vehicles' states and conditions, such as positions, linear and angular velocities, linear and angular accelerations, and linear and angular headings. In an embodiment, the receiver 1942 receives information about detected road anomalies from other autonomous vehicles and/or a centralized computer system. Such information can include the type of detected road anomaly, the time of detection, and the location of detection. In an embodiment, the receiver 1942 receives updated mapping information, including but not limited to, additional, less, or different road anomalies when compared to the current mapping information available to an autonomous vehicle. Such updated mapping information is provided by one or more other vehicles and/or a centralized computer system. In an embodiment, the receiver 1942 receives information from sensors 121 as shown in FIG. 1 and FIG. 4. The receiver 1942 receives such information in the various embodiments through a network. In an embodiment, the receiver 1942 is one of the communications devices 140 as shown in FIG. 1.

The transmitter 1944 is configured to transmit information from the anomaly detection system 1300 to the control module 406 (e.g., as shown in FIG. 4), one or more other autonomous vehicles, and/or a centralized computer system in accordance with the computation system 1950. In an embodiment, the transmitter 1944 is a laser or radio frequency wave transmitter. In an embodiment, the transmitter 1944 transmits one or more sensor outputs of the anomaly detection system 1300 the control module 406 (e.g., as shown in FIG. 4), one or more other autonomous vehicles, and/or a centralized computer system. In an embodiment, the transmitter 1944 transmits the output(s) of the anomaly detection module 1962 to the control module 406 (e.g., as shown in FIG. 4), one or more other autonomous vehicles, and/or a centralized computer system. In an embodiment, the transmitter 1944 transmits the output(s) of the mapping module 1960 to the control module 406 (e.g., as shown in FIG. 4), one or more other autonomous vehicles, and/or a centralized computer system. In an embodiment, the transmitter 1944 provides such information in the various embodiments through a network. In an embodiment, the transmitter 1944 is one of the communications devices 140 as shown in FIG. 1.

The computation system 1950 is configured to transmit data to, receive data from, interact with, and/or control one or more of the brush system 1910, sensor system 1920, and communication system 1940. As shown, computation system 1950 includes a processor 1952 and data storage 1954. The data storage 1954 is configured to store instructions 1956. In an embodiment, the computation system is the computer system 300 as shown in FIG. 3. In such an embodiment, the processor 1952 is the processor 304 as shown in FIG. 3. In such an embodiment, the data storage 1954 is made up of the main memory 306, the ROM 308, and/or the storage device 310. In other embodiments, the computation system 1950 may include more, fewer, or different components.

The mapping module 1960 is configured to receive detected anomalies and aspects of a navigable surface from other vehicles as inputs, and is configured to associate such information with a map of the autonomous vehicle and to output that information to the anomaly detection module 1962. The mapping module 1960 is also configured to input detected anomalies and aspects of a navigable surface determined by the anomaly detection module 1962, and is configured to output that information to other vehicles and/or a centralized computer system. Aspects of a navigable surface include, for example, the material that a section of a navigable surface is made out of, an expected friction value of a section of a navigable surface in ideal conditions, an expected friction value of a section of a navigable surface in wet conditions, an expected friction value of a section of a navigable surface in icy and/or snowy conditions, etc. In an embodiment, the mapping module 1960 is carried out on the autonomous vehicle by the computation system 1950 and outputs information to other vehicles and/or a centralized computer system through the communications system 1940 by means of the computation system 1950. In other embodiments, the mapping module is carried out on a centralized computer system that communicates with the autonomous vehicle through the communication system 1940.

The mapping module 1960 may place detected anomalies and aspects of a navigable surface determined from the anomaly detection module 1962 and/or other autonomous vehicles onto a map of the autonomous vehicle. At least the detected anomalies from the anomaly detection module 1962 and/or other autonomous vehicles will have a specific time, location, and type associated with them. In an embodiment, aspects of a navigable surface will have a location and type associated with them, but need not have a time associated with them. The specific location of the detected anomaly will help to place that detected anomaly on the map. For example, based on received information regarding detected road anomalies, the mapping module 1960 determines that in one mile there is a pothole in the right lane of the navigable surface on which the autonomous vehicle is traveling and that the navigable surface is wet with a lower than expected friction value for the next ten miles. The specific time is used by the mapping module 1960 in determining how much to weigh/trust the detected anomaly and/or in determining whether to erase, hide, or choose not to output previously detected anomalies. In an embodiment, the specific location of an aspect of a navigable surface is used by the mapping module 1960 to determine what sections of the navigable surface have that aspect and then associate those aspects with those sections of the navigable surface on the map. For example, based on received aspect information about a navigable surface, the mapping module 1960 determines that the next two mile section of a road on which the autonomous vehicle is traveling is made from asphalt and has a static friction value of 0.9 in ideal conditions.

In determining whether to erase, hide, or choose not to output previously detected anomalies (as well as other information, such as aspects of the navigable surface), the mapping module 1960 will look to the amount of time that has passed since the information was detected. After the detected anomaly or other information has reached a certain age (e.g., one hour, two hours, 6 hours, one day, one week, one month, one year, etc.), the detected anomalies or other information will be either erased, hidden, or never outputted by the mapping module 1960. The age needed to trigger such an action or inaction may depend on the type of information/type of anomaly. For example, the detection of moisture on the navigable surface may be erased or hidden within a lesser amount of time than say the detection of a pothole because it is reasonable to assume that the road will dry prior to the pothole being fixed. In an embodiment, aspects of a navigable surface, such as the material it is made out of or its expected friction value in ideal conditions, should never be hidden or erased. In an embodiment, aspects of a navigable surface should only be hidden or erased after a significant period of time (e.g., one year, etc.). In an embodiment, aspects of a navigable surface are determined by averaging out the calculated aspects of the navigable surface from each of the vehicles.

The anomaly detection module 1962 is configured to receive the outputs of the number of sensors of the anomaly detection system 1300 as an input, the outputs of one or more sensors outside of the anomaly detection system 1300 (e.g., wheel speed sensors for measuring or estimating wheel slip ratios) as an input, and outputted information from the mapping module 1960 as an input. The anomaly detection module 1962 is also configured to determine one or more anomalies of a navigable surface on which an autonomous vehicle is traveling as an output, and determine a desired driving capability as an output. The determined one or more anomalies of the navigable surface are sent to the mapping module 1960. The determined desired driving capability of the anomaly detection module 1962 is sent to the control module 406 (e.g., as shown in FIG. 4) of the autonomous vehicle. In an embodiment, the anomaly detection module 1962 is carried out on the autonomous vehicle by the computation system 1950. In other embodiments, the anomaly detection module is carried out on a centralized computer system that communicates with the autonomous vehicle through the communication system 1940.

Based on the outputs of the various sensors, the anomaly detection module 1962 determines one or more anomalies of a navigable surface on which an autonomous vehicle is traveling. These anomalies include, for example, a lower friction value than expected of the navigable surface, water or moisture on or near the navigable surface, snow or ice on the navigable surface, a pothole, rumble strips, obstacles in the road, etc. In an embodiment, in determining the one or more anomalies of a navigable surface, the anomaly detection module 1962 also determines one or more aspects of the navigable surface. These aspects may include, for example, the type of material the navigable surface is made out of, a slip ratio of the navigable surface, a friction value of the navigable surface, etc. In an embodiment, certain aspects of the navigable surface, such as the type of material the navigable surface is made out of or an expected friction value of the navigable surface in various conditions, are already known and are associated with a particular section of a navigable surface. A determination or look-up of the type of material can be used to determine an expected friction of a particular section of a navigable surface for ideal conditions, wet conditions, icy conditions, and/or snowy conditions. In an embodiment, known aspect information is stored on a remote database or in the data storage 1954 of the autonomous vehicle. Known aspect information is created through previous calculations by the autonomous vehicle and/or other vehicles. In an embodiment, known aspect information is estimated based on a known material of the navigable surface and associated with a condition of the navigable surface. For example, a remote database and/or the data storage 1954 may store a table noting that when the material of the navigable surface is asphalt, the expected static friction value is 0.9 when the navigable surface is dry, 0.5 when the navigable surface is wet, and 0.25 when the navigable surface is icy or snowy. In an embodiment, there is also a stored table of kinetic friction values for various navigable surface materials.

In determining one or more anomalies of a navigable surface on which an autonomous vehicle is traveling, the anomaly detection module 1962 uses machine learning algorithms. Such algorithms include but are not limited to classification type supervised learning algorithms, such as, for example, naive Bayes, support vector machines, and/or a neural networks. The predictive model resulting from a naive Bayes (based on Bayes' Theorem) are computationally efficient and allow each attribute/input to contribute towards the final decision (e.g., classification) equally and independently from the other attributes/inputs. The predictive model resulting from a support vector machine are more computationally demanding and output an optimal hyperplane—in two dimensional space this hyperplane is a line dividing a plane in two parts—which categorizes new examples. For example, given a set of training examples, the model plots the trained examples and then separates them, such that a first classification is on one side of the division and a second classification is on the other side of the division. New examples are then mapped into the same space and classified based on which side of the division they fall in. The predictive model resulting from a neural network allows for the representation of complex relationships between the inputs (e.g., sensor output) and the outputs (e.g., the classification). The neural network consists of units arranged in layers which convert an input vector into some output by applying a function to the input and then passing the resulting output to the next layer. Such algorithms rely, for example, on historical and/or real-time data. Historical data includes for example, prior outputs of sensors of the autonomous vehicle or other vehicles, prior outputs of the anomaly detection module 1962 or, in some embodiments, the anomaly detection modules of other vehicles, etc. Real-time data includes, for example, the speed of the vehicle, the current outputs of sensors, the orientation of the vehicle, etc. In an embodiment, the predictive models compare the real-time data with the historical data in order to detect an anomaly.

In embodiment, in determining a friction of the navigable surface, the anomaly detection module 1962 inputs the outputs from the one or more strain/pressure sensors 1928, the one or more rotary position sensors 1930, the GPS 1922, the accelerometer 1924, and/or the gyroscope 1926. In an embodiment, the anomaly detection module 1962 also inputs the determined slip ratio to help determine a friction value of the navigable surface and/or verify a calculated friction value of the navigable surface. In an embodiment, the anomaly detection module 1962 also inputs the output of the one or more temperature sensors 1934 and moisture sensors 1932 to determine the friction value of the navigable surface and/or verify a calculated friction value of the navigable surface. In an embodiment, the anomaly detection module 1962 also inputs information from the mapping module 1960 regarding previously determined friction values of the navigable surface. Such friction values may include friction values determined by other vehicles that had previously traveled on the section of the navigable surface on which the autonomous vehicle is currently traveling. In an embodiment, the input of such friction values is limited to those friction values which were calculated near in time (e.g., one hour, thirty minutes, 15 minutes, etc.). The determination of which values are near in time may be handled by the mapping module 1960. In such an embodiment, the mapping module 1960 would only provide the anomaly detection module 1962 detected friction values of a navigable surface that are near in time for the determination of a current friction value of a navigable surface. The anomaly detection module 1962 outputs the determined friction value, a location where that friction value was determined, and a time when the friction value was determined to the mapping module 1960.

In an embodiment, in determining a slip ratio of the navigable surface, the anomaly detection module 1962 inputs the outputs from any wheel speed sensors for measuring or estimating wheel slip ratios, and the GPS 1922. Such estimated wheel slip ratio may be used to determine a current friction of the navigable surface and/or an expected friction of the navigable surface. Based on the wheel slip ratio, the anomaly detection module 1962 determines a desired driving capability. In an embodiment, when slip is present, the desired driving capability includes a determination to slow the vehicle down. In an embodiment, when slip is present, the desired driving capability includes a determination let off the throttle. In an embodiment, when slip is present, the desired driving capability includes a determination to engage the brakes 103 (e.g., as shown in FIG. 1). In an embodiment, when slip is present, the desired driving capability includes a determination to apply an anti-lock braking system (ABS) of the autonomous vehicle.

In an embodiment, in determining an expected friction value of a navigable surface, the anomaly detection module inputs the outputs from any wheel speed sensors for measuring or estimating wheel slip ratios, the outputs of the one or more temperature sensors 1934 and moisture sensors 1932, the GPS 1922, information from the mapping module 1960 regarding previously determined aspect information of the navigable surface, and/or information from a remote database or data storage 1954 regarding already known aspect information. Such aspect information would include, for example, expected friction values of a particular section of a navigable surface on which the autonomous vehicle is traveling in various conditions. In an embodiment, if slip is detected, the anomaly detection module 1962 will refer to a kinetic friction values to determine an expected friction value. For example, if slip is detected, the anomaly detection module 1962 refers to a stored kinetic friction table for the type of material that the current section of the navigable surface on which the autonomous vehicle is traveling is made out of. In such an embodiment, if no slip is detected, the anomaly detection module 1962 will refer to static friction values to determine an expected friction value. For example, if slip is not detected, the anomaly detection module 1962 refers to a stored static friction table for the type of material that the current section of the navigable surface on which the autonomous vehicle is traveling is made out of. In an embodiment, the anomaly detection module 1962 will refer to a table and/or graph of the detected slip ratio for the type of material that the current section of the navigable surface on which the autonomous vehicle is traveling is made out of.

In an embodiment, once a table and/or graph is determined, the anomaly detection module uses the one or more temperature sensors 1934 and moisture sensors 1932 to determine a current condition of the road and look up an expected friction value from the table and/or graph based on the current condition. For example, if the one or more moisture sensors 1932 detects moisture and the one or more temperature sensors 1934 detects that the temperature is above freezing, then the anomaly detection module 1962 refers to an expected friction value for wet conditions for the type of material that the current section of the navigable surface on which the autonomous vehicle is traveling is made out of. Such conditions are outputted to the mapping module 1960. Such conditions may trigger the anomaly detection module 1962 to determine a desired driving capability, such as a determination to slow the vehicle down if ice is detected on the road. In an embodiment, the anomaly detection module 1962 will use previously determined conditions to determine an expected friction value. For example, if other vehicles had determined ten minutes ago that there is moisture on the navigable surface up ahead, the anomaly detection module 1962 may refer to an expected friction value for wet conditions for the type of material that the section of the navigable surface where the moisture was detected is made out of. In an embodiment, only an expected static friction value is determined. In such an embodiment, it is not necessary to use the wheel speed sensors in determining an expected friction value, though the detection of slip by the wheel speed sensor may be used by the anomaly detection module 1962 to determine a desired driving capability.

In an embodiment, in determining whether a detected friction value is a lower than an expected friction value of the navigable surface on which the autonomous vehicle is traveling, the anomaly detection module 1962 compares the determined friction value with an expected friction value. If the determined friction value is less than an expected friction value, the anomaly detection module 1962 will determine a desired driving capability. In an embodiment, when the determined friction value is less than an expected friction value, the desired driving capability includes a determination to slow the vehicle down. In an embodiment, when the determined friction value is less than an expected friction value, the desired driving capability includes a determination let off the throttle. In an embodiment, when the determined friction value is less than an expected friction value, the desired driving capability includes a determination to engage the brakes 103 (e.g., as shown in FIG. 1). In an embodiment, the anomaly detection module 1962 outputs the detection of a friction value lower than an expected friction value to the mapping module 1960. Such a detection indicates, for example, oil and/or ice on the navigable surface.

In an embodiment, in determining a material of the navigable surface, the anomaly detection module 1962 inputs the outputs from any wheel speed sensors for measuring or estimating wheel slip ratios and any sensors of anomaly detection system 1300. Based on the detected slip ratio, the anomaly detection module 1962 uses the detected slip ratio along with a detected friction of a navigable surface to narrow down a list of possible materials and/or possible conditions of the navigable surface. The anomaly detection module 1962 then uses the one or more temperature sensors 1934 and moisture sensors 1932 to determine a current condition of the navigable surface, and, thus, determine a material of that section of the navigable surface. In some embodiments, such information is provided to the mapping module 1960.

In an embodiment, in determining whether a pothole has been detected, the anomaly detection module 1962 inputs the outputs of the one or more strain/pressure sensors 1928, any strain/pressure sensors mounted to the suspension of the autonomous vehicle, the one or more rotary position sensors 1930, and the GPS 1922. In some embodiments, the anomaly detection module 1962 also inputs the outputs of the accelerometer 1924 and/or the gyroscope 1926 in order to determine whether a pothole has been detected. In some embodiments, the anomaly detection module 1962 also inputs the outputs of any wheel speed sensors in order to determine whether a pothole has been detected. If a pothole has been detected, a time of detection, location of detection, and, in some embodiments, a size of the pothole is sent to the mapping module 1960.

In an embodiment, in determining whether rumble strips have been detected, the anomaly detection module 1962 inputs the outputs of the one or more strain/pressure sensors 1928, any strain/pressure sensors mounted to the suspension of the autonomous vehicle, the one or more rotary position sensors 1930, and the GPS 1922. In some embodiments, the anomaly detection module 1962 also inputs the outputs of the accelerometer 1924 and/or the gyroscope 1926 in order to determine whether rumble strips have been detected. In some embodiments, the anomaly detection module 1962 also inputs the outputs of any wheel speed sensors in order to determine whether rumble strips have been detected. In differentiating between a pothole and rumble strips, the anomaly detection module 1962 may look to the magnitude of the sensors output, e.g., the force on a strain/pressure sensor from a rumble strip cavity will usually be smaller than that of a pothole cavity. In addition, anomaly detection module 1962 may look to the frequency of cavity detections. For example, if a number of small cavities are detected in a row, then they anomaly detection system will determine that the anomalies are rumble strips and not a series of potholes. Based on the detection of rumble strips, the anomaly detection module 1962 determines a desired driving capability. In an embodiment, when rumble strips are detected by sensors located on the right side of the vehicle, the desired driving capability includes a determination to steer the vehicle to the left. In that embodiment, when rumble strips are detected by sensors located on the left side of the vehicle, the desired driving capability includes a determination to steer the vehicle to the right.

In an embodiment, in determining whether an obstacle has been detected, the anomaly detection module 1962 inputs the outputs of the one or more strain/pressure sensors 1928, any strain/pressure sensors mounted to the suspension of the autonomous vehicle, the one or more rotary position sensors 1930, and the GPS 1922. In some embodiments, the anomaly detection module 1962 also inputs the outputs of the accelerometer 1924 and/or the gyroscope 1926 in order to determine whether an obstacle has been detected. The accelerometer 1924 and/or gyroscope 1926 would be useful helpful in determining a size and/or mass of an obstacle. If an obstacle has been detected, a time of detection, location of detection, and, in some embodiments, a size and/or mass of the obstacle are sent to the mapping module 1960.

In determining a desired driving capability, the anomaly detection module 1962 relies on historical, real-time, and/or predictive information. Historical information may include previously obtained information from the autonomous vehicle or other vehicles. Historical information may also include a set of previously determined driving capabilities. Such previously determined driving capabilities may be associated with a time, a location, information on the road's assets, information on the road's detected anomalies/conditions at the time of determination, and information as to whether that determined driving capabilities had a safe and/or effective result when executed. When determining a desired driving capability, the anomaly detection module 1962 may try and match the expected and/or detected conditions/anomalies of a navigable surface with those associated with a previously determined driving capability that had a safe and/or effective result when executed. The anomaly detection module 1962 may also uses machine learning algorithms. Such algorithms include but are not limited to naive Bayes, support vector machines, and/or a neural networks. Such machine learning algorithms may rely on historical and/or real-time data. For example, machine learning algorithm can be generated based on vehicle speed, vehicle telemetry data, detected road conditions by the vehicle and/or one or more other vehicles, vehicle location and, in some examples, associated speed limit of road on which vehicle is located, historical data from the vehicle and/or other vehicles, and any other information collected by the computation system 1950 and/or by a centralized computer system.

In determining a desired driving capability, the anomaly detection module 1962 first looks to previously obtained information, such as anomaly detection information from other vehicles. Based on previously obtained information, the anomaly detection module 1962 will determine a desired driving capability for an upcoming section of a navigable surface on which the autonomous vehicle is expected to travel, i.e. where the upcoming section of a navigable surface falls on the current route of the autonomous vehicle. Such determined desired driving capabilities may include, for example, slowing the vehicle down if water, snow, and/or ice has been detected on the navigable surface up ahead, slowing the vehicle down if the expected friction value of an upcoming section of the navigable surface is less than a current friction value, speeding the vehicle up if the expected friction value of an upcoming section of the navigable surface is greater than a current friction value, speeding the vehicle up if water, snow, and/or ice is currently detected on the navigable surface but has not been detected on a section of the navigable surface up ahead, steering the autonomous vehicle into another lane when an obstacle has been detected up ahead in the autonomous vehicle's current lane, steering the autonomous vehicle into another lane when a pothole has been detected up ahead in the autonomous vehicle's current lane, etc. A determination to slow the vehicle down can include a determination to let off the throttle and/or a determination to apply the brakes 103 (e.g., as shown in FIG. 1). A determination to speed the vehicle up can include a determination to open up the throttle. In an embodiment, determined desired driving capabilities based on previously obtained information are sent to the control module 406 (e.g., as shown in FIG. 4) to be executed just before the autonomous vehicle reaches the section of the navigable surface associated with the previously obtained information. In an embodiment, determining a desired driving capability also includes selecting a new route for the autonomous vehicle to travel. Unlike other determined desired driving capabilities, one which involves selecting a new route is sent to the mapping module 1960 to be executed. In an embodiment, determined desired driving capabilities based on previously obtained information and which involve speeding up the vehicle are not sent to the control module 406 (e.g., as shown in FIG. 4) to be executed until the anomaly detection system 1300 or other sensors on the autonomous vehicle corroborates the previously obtained information.

In determining a desired driving capability, the anomaly detection module 1962 also looks to conditions and/or anomalies of the navigable surface detected in real-time by the anomaly detection system 1300 and/or other sensors present on the autonomous vehicle. Based on this real-time information, the anomaly detection module 1962 will determine a desired driving capability and/or adjust a previously determined desired driving capability. Such determined desired driving capabilities may include, for example, slowing the vehicle down if water, snow, and/or ice has been detected on the navigable surface, slowing the vehicle down if the determined friction value of the navigable surface is less than an expected friction value, speeding up the vehicle is the determined friction value of the navigable surface is greater than an expected friction value, speeding the vehicle up if water, snow, and/or ice is not currently detected on the navigable surface but which was expected to be detected, steering the autonomous vehicle left when rumble strips are detected on the right side of the autonomous vehicle, steering the autonomous vehicle to the right when rumble strips are detected on the left side of an autonomous vehicle, etc. A determination to slow the vehicle down can include a determination to let off the throttle and/or a determination to apply the brakes 103 (e.g., as shown in FIG. 1). A determination to speed the vehicle up can include a determination to open up the throttle.

Example Processes for Detecting Anomalies with an Autonomous Vehicle

Figure 20:
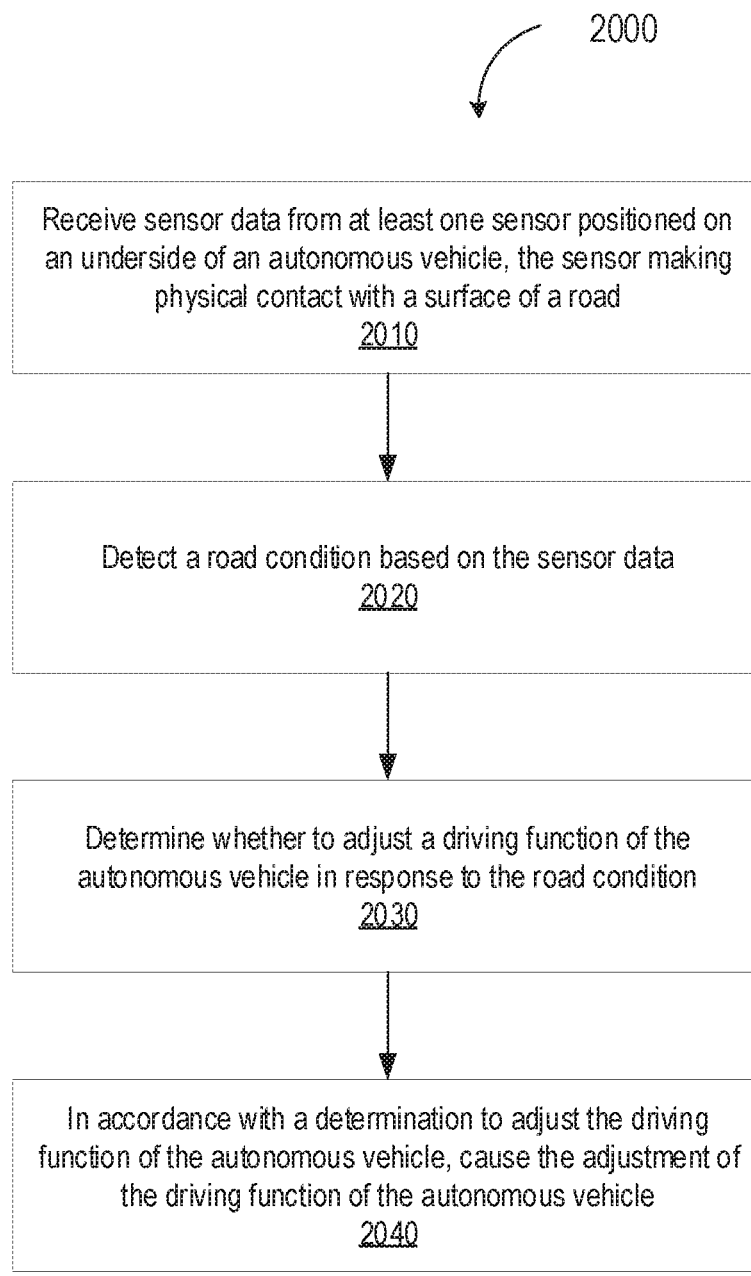
FIG. 20 is a flow chart diagram showing an example process for detecting an anomaly and adjusting a driving function of an autonomous vehicle.

FIG. 20 shows an example process 2000 for detecting an anomaly and adjusting a driving function of an autonomous vehicle. The process 2000 can be performed, at least in part, using one or more of the systems described herein (e.g., using one or more computer systems, AV systems, autonomous vehicles, etc.).

In the process 2000, a computer system receives sensor data from at least one sensor positioned on an underside of an autonomous vehicle, the sensor making physical contact with a surface of a road (step 2010). The sensor data from a sensor making physical contact with a surface of a road can indicate information about the road that an autonomous vehicle is traveling on. Various examples of such sensor data are described herein. As an example, such sensor data can include an indication of the friction factor of the road's surface and, thus, whether the water, ice, and/or snow is present on the road's surface. As another example, such sensor data can include an indication of a temperature of the road's surface and, thus, whether ice or snow is likely to form/collect on the road's surface. As another example, such sensor data can include an indication of moisture on the road's surface. As another example, such sensor data can include an indication of a cavity in the road's surface.

The computer system then detects a road condition based on the sensor data (step 2020). Various examples of user profile data are described herein. As examples, detected road conditions can include an indication of a pothole, an indication of a rumble strip, an indication of water on the road, an indication of ice on the road, and/or an indication of snow on the road.

The computer system determines whether to adjust a driving function of the autonomous vehicle in response to the road condition (step 2030). Various techniques for determining whether to adjust a driving function of the vehicle are described herein. For example, such a determination can be made using a model of the most appropriate driving action for the one or more autonomous vehicles to take in view of the detected road conditions. This can be, for example a statistical model and/or algorithm, such as a Bayesian model, a neural network algorithm, and/or a support vector algorithm. The machine learning algorithms can be generated based on vehicle speed, vehicle telemetry data, detected road conditions by the vehicle or one or more other vehicles, vehicle location and, in some examples, associated speed limit of road on which vehicle is located, and any other information collected by the computer system. In some embodiments, the speed of the vehicle, telemetry data of the vehicle, and/or vehicle location in view of one or more detected road conditions by the vehicle or one or more other vehicles may be compared with similar information associated with previously executed driving functions in order to determine a driving action to take.

The computer, in accordance with a determination to adjust the driving function of the autonomous vehicle, causes the adjustment of the driving function of the autonomous vehicle (step 2040). Various examples adjustments of the driving function are described herein. As examples, adjustments of the driving function can include adjusting the speed of the vehicle, accelerating the vehicle quickly, decelerating the vehicle quickly, moving the vehicle left or right, choosing a new path of the vehicle, and stopping the vehicle.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A fully autonomous vehicle (AV), comprising:
    a plurality of sensors coupled to the AV, wherein at least one sensor of the plurality of sensors is positioned on an undercarriage of the AV and in physical contact with a navigable surface on which the AV is traveling, and wherein the plurality of sensors are configured to:
        detect variations of the navigable surface on which the AV is traveling; and
        generate information corresponding to the variations of the navigable surface; and
    a processing circuit configured to:
        receive the information corresponding to the variations of the navigable surface; and
        augment a driving capability of the AV based on the information including:
            determining that the navigable surface has a level of traction that does not satisfy a threshold; and
            in response to the determination, adjusting, using a control circuit, a speed of the AV.

2. The fully autonomous vehicle of claim 1, wherein the processing circuit processes, using one or more machine learning algorithms, the information corresponding to the variations that is received from the plurality of sensors.

3. The fully autonomous vehicle of claim 2, wherein the one or more machine learning algorithms comprises at least one support vector machine algorithm.

4. The fully autonomous vehicle of claim 2, wherein the one or more machine learning algorithms comprises at least one neural network algorithm.

5. The fully autonomous vehicle of claim 1, wherein the processing circuit transmits the information collected by the plurality of sensors to a remote server, wherein the remote server exchanges information with other vehicles connected to the remote server.

6. The fully autonomous vehicle of claim 1, wherein the processing circuit transmits the information collected by the plurality of sensors to one or more other vehicles that are in a vicinity of the AV corresponding to the plurality of sensors.

7. The fully autonomous vehicle of claim 1, wherein augmenting the driving capability of the AV comprises:
    detecting, using the processing circuit, an obstacle on the road according to the information collected by the plurality of sensors; and
    in response to the detecting, adjusting, using a control circuit, a steering of the AV to avoid the obstacle.

8. The fully autonomous vehicle of claim 1, wherein the processing circuit is configured to:
    detect lane demarcations on a surface of the road according to the information collected by the plurality of sensors, wherein the lane demarcations are distinguishable from the navigable surface according to the information collected by the plurality of sensors; and
    generate a map of lane lines on the surface of the road using the lane demarcations.

9. The fully autonomous vehicle of claim 1, wherein augmenting the driving capability of the AV comprises:
    determining, using the processing circuit, that the variations of the navigable surface occur at periodic intervals; and
    in response to the determination, steering, using a control circuit, the AV in a direction towards a section of the road away from the variations on the surface of the road.

10. The fully autonomous vehicle of claim 1, wherein augmenting the driving capability of the AV comprises:
    determining, using the processing circuit, that the variations of the navigable surface occur at periodic intervals; and
    in response to the determination, reducing a speed of the AV.

11. The fully autonomous vehicle of claim 1, wherein augmenting the driving capability of the AV comprises:

determining, using the information collected by the plurality of sensors, a slip ratio of a surface of the road;
in response to the determination, estimating a friction value of the surface of the road; and
adjusting the driving capability of the AV in accordance with the estimated friction value.

12. The fully autonomous vehicle of claim 11, wherein augmenting the driving capability of the AV further comprises:
determining, using the estimated friction value, a type of material used for a surface of the road; and
adjusting a speed of the AV in accordance with type of material used for the surface of the road.

13. The fully autonomous vehicle of claim 1, wherein augmenting the driving capability of the AV comprises:
performing a look up of a friction table using the information collected by the plurality of sensors;
in response to the look up, estimating a friction value of a surface of the road; and adjusting the driving capability of the AV in accordance with the estimated friction value.

14. The fully autonomous vehicle of claim 1, wherein the plurality of sensors comprises:
a first sensor;
a second sensor; and
wherein the first sensor processes information of a first type and the second sensor processes information of a second type that is different than the first type.

15. The fully autonomous vehicle of claim 1, wherein the processing circuit generates, using the information collected by the plurality of sensors, a height map of a surface of the road.

16. The fully autonomous vehicle of claim 1, wherein the processing circuit is configured to:
determine, using the information collected by the plurality of sensors, a condition of a surface of the road; and
classify the determined condition of the surface of the road as having one or more of snow, ice, rain or obstacles.

17. The fully autonomous vehicle of claim 1, wherein augmenting the driving capability of the AV comprises:
receiving, from one or more neighboring vehicles, additional information about variations of the navigable surface;
comparing the information collected by the plurality of sensors to the additional information received from the one or more neighboring vehicles; and
computing a confidence measure in the information collected by the plurality of sensors in accordance with the comparison.

18. The fully autonomous vehicle of claim 1, wherein the plurality of sensors comprises a sensor array, and wherein the sensor array includes sensors positioned in one or more rows.

19. The fully autonomous vehicle of claim 1, wherein the plurality of sensors comprises one or more sensors embedded in at least one of a tire of the AV or a suspension of the AV.

20. The fully-autonomous vehicle of claim 1, wherein the at least one sensor is positioned at an end of a bristle on the undercarriage of the AV.

21. A method of operating a fully autonomous vehicle (AV), comprising:
receiving information from a plurality of sensors coupled to the AV, the information corresponding to variations of a navigable surface on which the AV is traveling, wherein at least one sensor of the plurality of sensors is positioned on an undercarriage of the AV and is in physical contact with the navigable surface; and
augmenting a driving capability of the AV based on the information, including:
determining that the navigable surface has a level of traction that does not satisfy a threshold; and
in response to the determination, adjusting a speed of the AV.

22. A system, comprising:
a fully autonomous vehicle (AV);
a plurality of sensors coupled to the AV, wherein at least one sensor of the plurality of sensors is positioned on an undercarriage of the AV and in physical contact with a navigable surface on which the AV is traveling, and wherein the plurality of sensors are configured to:
detect variations of the navigable surface on which the AV is traveling; and
generate information corresponding to the variations of the navigable surface; and
a first device with one or more processors and memory, the first device configured to:
receive the information corresponding to the variations of the navigable surface;
augment a driving capability of the AV based on the information, including:
determining that the navigable surface has a level of traction that does not satisfy a threshold; and
in response to the determination, adjusting a speed of the AV.

23. A non-transitory computer-readable medium encoding instructions operable to cause a data processing apparatus to:
receive information from a plurality of sensors coupled to an autonomous vehicle (AV), the information corresponding to variations of a navigable surface on which the AV is traveling, wherein at least one sensor of the plurality of sensors is positioned on an undercarriage of the AV and is in physical contact with the navigable surface; and
augment a driving capability of the AV based on the information, including:
determining that the navigable surface has a level of traction that does not satisfy a threshold; and
in response to the determination, adjusting a speed of the AV.

* * * * *